US012557018B2

United States Patent
Xu et al.

(10) Patent No.: US 12,557,018 B2
(45) Date of Patent: Feb. 17, 2026

(54) CONCURRENT LOW POWER WAKE UP RADIO (LP-WUR) AND MAIN RADIO (MR) OPERATIONS

(71) Applicant: QUALCOMM Incorporated, San Diego, CA (US)

(72) Inventors: Huilin Xu, Temecula, CA (US);
Ahmed Elshafie, San Diego, CA (US);
Wanshi Chen, San Diego, CA (US);
Diana Maamari, San Diego, CA (US);
Peter Gaal, San Diego, CA (US);
Nicolas Cornillet, Lannion (FR)

(73) Assignee: Qualcomm Incorporated, San Diego, CA (US)

( * ) Notice: Subject to any disclaimer, the term of this patent is extended or adjusted under 35 U.S.C. 154(b) by 600 days.

(21) Appl. No.: 17/937,105

(22) Filed: Sep. 30, 2022

(65) Prior Publication Data

US 2024/0114453 A1    Apr. 4, 2024

(51) Int. Cl.
*H04W 52/02* (2009.01)
*H04W 72/23* (2023.01)
*H04W 76/28* (2018.01)

(52) U.S. Cl.
CPC ....... *H04W 52/0235* (2013.01); *H04W 72/23* (2023.01); *H04W 76/28* (2018.02)

(58) Field of Classification Search
CPC . H04W 52/0235; H04W 72/23; H04W 76/28; H04W 52/0216; H04W 52/0229; Y02D 30/70
See application file for complete search history.

(56) References Cited

U.S. PATENT DOCUMENTS

| | | | | |
|---|---|---|---|---|
| 2019/0320389 | A1* | 10/2019 | Alanen | H04W 72/0446 |
| 2020/0367167 | A1* | 11/2020 | Nam | H04W 76/28 |
| 2022/0095226 | A1* | 3/2022 | Chang | H04W 52/0229 |
| 2023/0300750 | A1* | 9/2023 | Wu | H04W 52/0232 |
| 2024/0098644 | A1* | 3/2024 | Ye | H04W 52/0216 |
| 2024/0098645 | A1* | 3/2024 | Ye | H04W 76/27 |
| 2024/0196469 | A1* | 6/2024 | Oteri | H04W 76/27 |
| 2025/0048381 | A1* | 2/2025 | Cao | H04L 5/0053 |

OTHER PUBLICATIONS

3GPP TSG RAN WG1 #100; R1-2000337; Source: vivo; Title: Maintenance of PDCCH-based power saving signal; e-Meeting, Feb. 24-Mar. 6, 2020. See §2.1, §2.2, §2.3, §2.4.1, §2.6. (Year: 2020).*
3GPP TSG RAN WG1 #100bis; R1-2001682; Source: vivo; Title: Maintenance of PDCCH-based power saving signal; e-Meeting, Apr. 20-30, 2020. (Year: 2020).*
3GPP TSG RAN Rel-18 workshop; RWS-210064; Source: Spreadtrum Communications; Title: UE power saving enhancements for R18; Electronic Meeting, Jun. 28-Jul. 2, 2021 (Year: 2021).*

* cited by examiner

*Primary Examiner* — Mohammed S Chowdhury
(74) *Attorney, Agent, or Firm* — Procopio, Cory, Hargreaves & Savitch LLP

(57) ABSTRACT

A method for wireless communication at a user equipment (UE) and related apparatus are provided. The apparatus is configured to receive a configuration for a wake-up signal associated with a second radio having a lower power consumption than a first radio at the UE. The configuration includes a starting time for an operation of the first radio based on a reception of the wake-up signal. The apparatus is further configured to receive the wake-up signal via the second radio, and start the operation of the first radio at the starting time following the reception of the wake-up signal via the second radio.

27 Claims, 16 Drawing Sheets

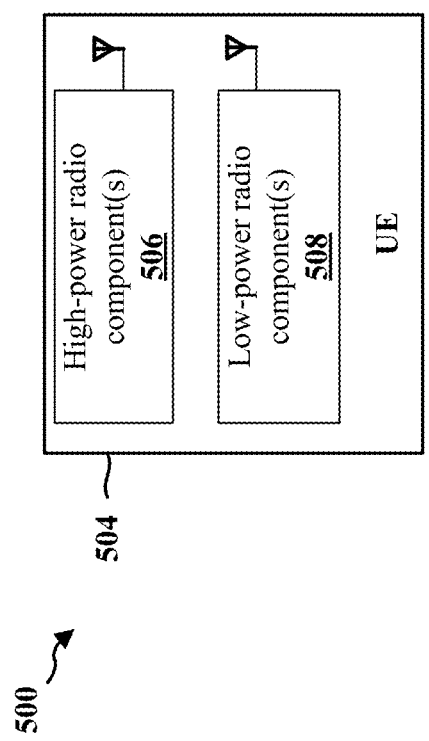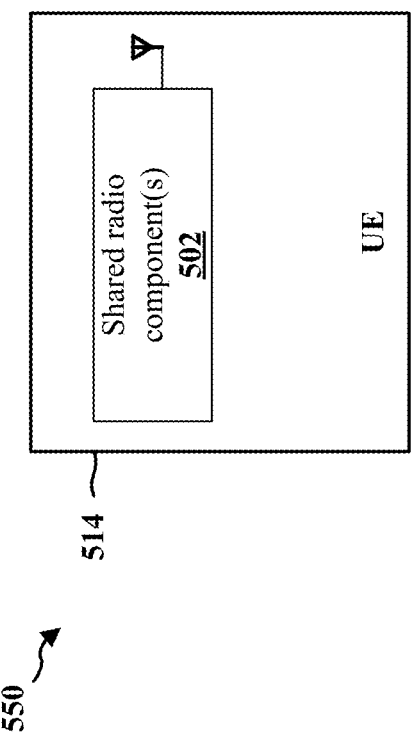

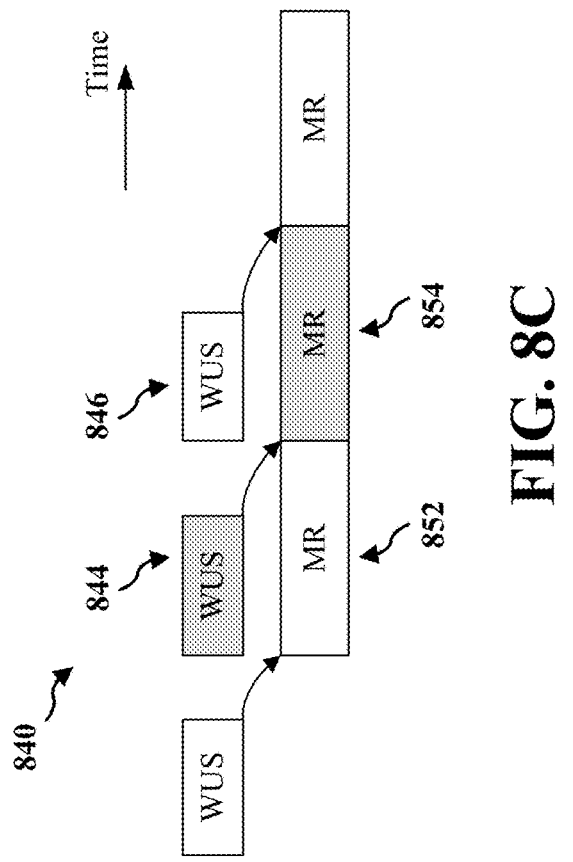
FIG. 8A
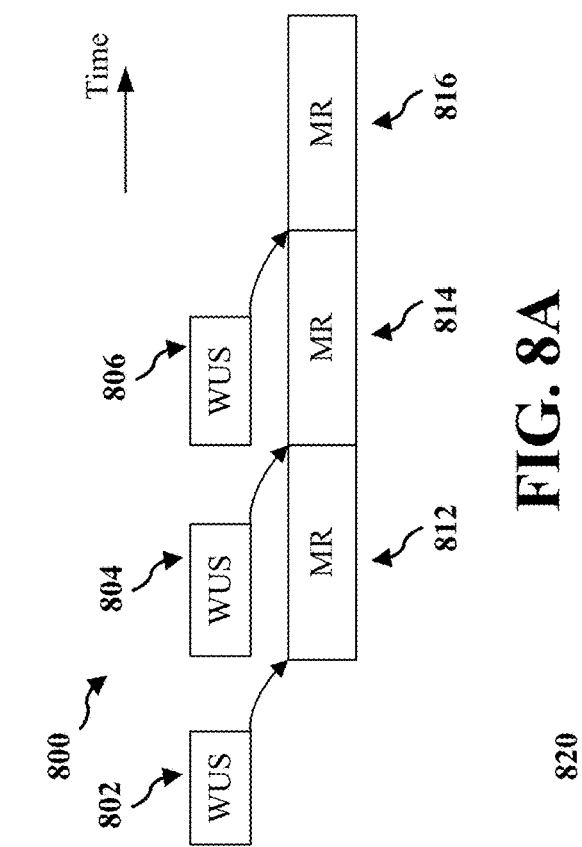
FIG. 8B
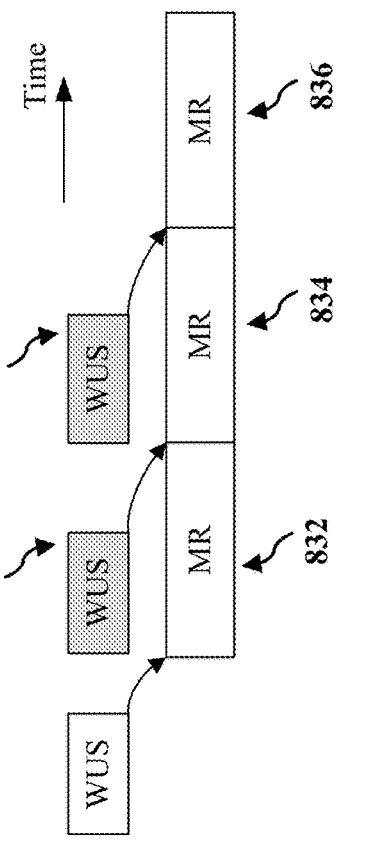
FIG. 8C
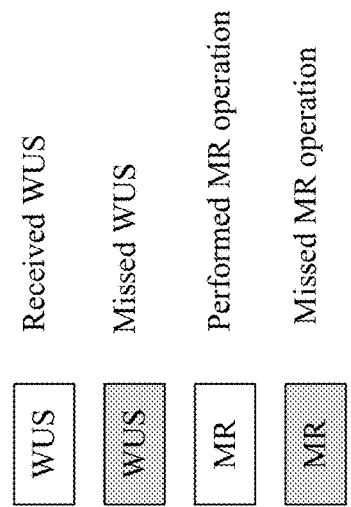

CONCURRENT LOW POWER WAKE UP RADIO (LP-WUR) AND MAIN RADIO (MR) OPERATIONS

TECHNICAL FIELD

The present disclosure relates generally to communication systems, and more particularly, to wireless communication with concurrent low power wakeup radio (LP-WUR) and main radio (MR) operations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory; and at least one processor coupled to the memory and configured to receive a configuration for a wake-up signal associated with a second radio having a lower power consumption than a first radio at the UE. The configuration may include a starting time for an operation of the first radio based on a reception of the wake-up signal. The at least one processor is further configured to receive the wake-up signal via the second radio; and start the operation of the first radio at the starting time following the reception of the wake-up signal via the second radio.

In an aspect of the disclosure, a method, a computer-readable medium, and an apparatus are provided for wireless communication at a UE. The apparatus may include memory; and at least one processor coupled to the memory and configured to receive a configuration for a wake-up signal associated with a second radio having a lower power consumption than a first radio at the UE; receive the wake-up signal via the second radio; and start, in response to the wake-up signal via the second radio, an operation via the first radio and concurrently monitoring for the wake-up signal via the second radio.

In an aspect of the disclosure, a method, a computer-readable medium, and an apparatus are provided for wireless communication at a network entity. The apparatus may include memory; and at least one processor coupled to the memory and configured to transmit, to a UE, a configuration for a wake-up signal associated with a second radio having a lower power consumption than a first radio at the UE. The configuration may include a starting time for an operation of the first radio based on a reception of the wake-up signal. The at least one processor is further configured to transmit the wake-up signal for the UE; and communicate with the UE based on the operation of the first radio at the starting time following the of the wake-up signal via the second radio.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5A is a diagram illustrating a UE with a high-power radio and a low-power radio.

FIG. 5B is a diagram illustrating a UE with shared radio component(s).

FIGS. 8A, 8B, and 8C are diagrams illustrating the concurrent MR and LP-WUR operations in accordance with various aspects of the present disclosure.

DETAILED DESCRIPTION

Figure 1:
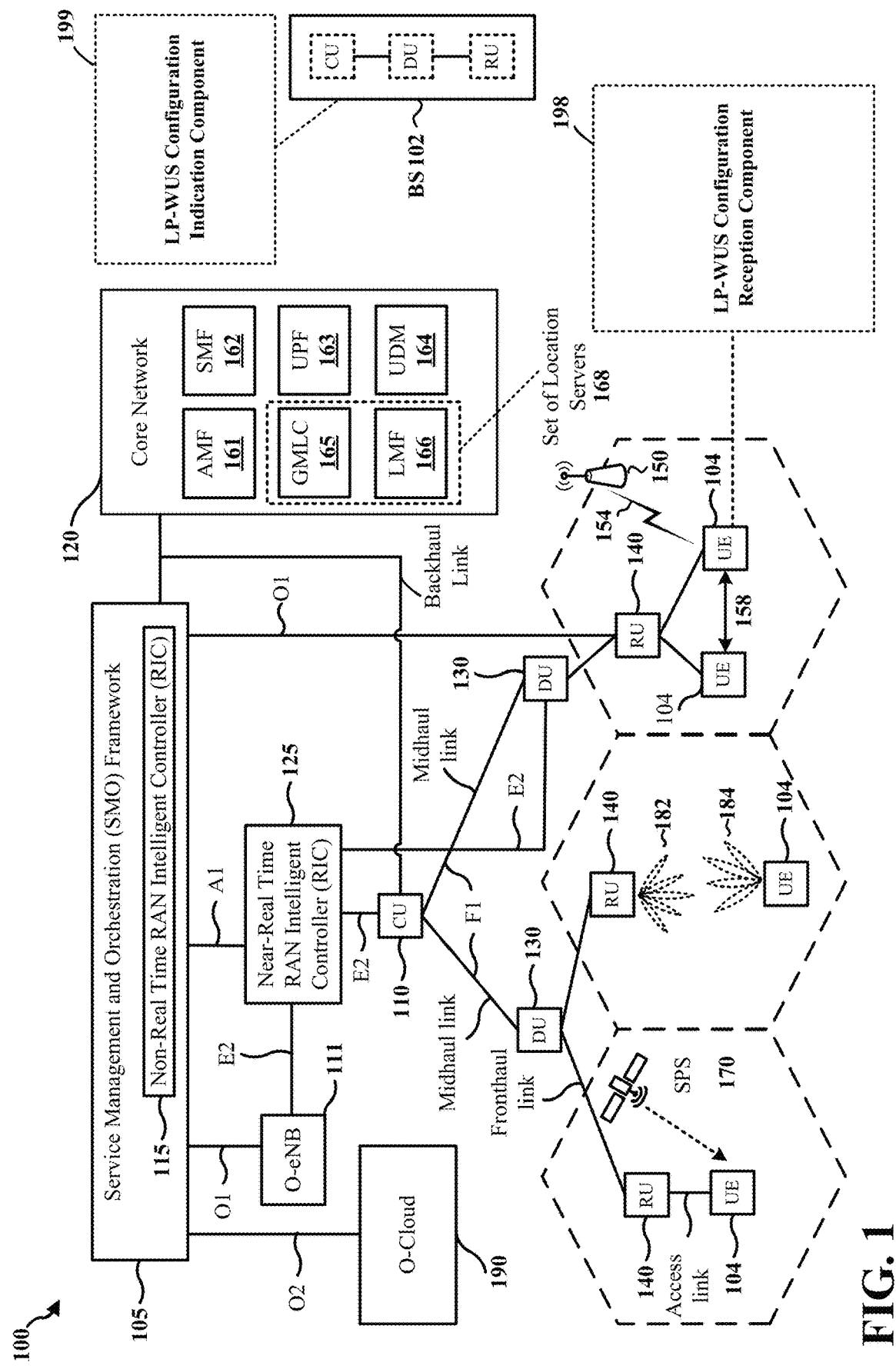
FIG. 1 is a diagram illustrating an example of a wireless communication system and an access network.

This disclosure provides a method for wireless communication at a UE. The method may include receiving a configuration for a wake-up signal associated with a second radio having a lower power consumption than a first radio at the UE, the configuration including a starting time for an operation of the first radio based on a reception of the wake-up signal; receiving the wake-up signal via the second radio; and starting the operation of the first radio at the starting time following the reception of the wake-up signal via the second radio. The method enables floating CDRX and floating XR-dedicated PDCCH monitoring window through LP-WUS, and concurrent LP-WUR and MR operations. Thus, it improves the efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an LP-WUS configuration reception component 198. In one aspect, the LP-WUS configuration reception component 198 may be configured to receive a configuration for a wake-up signal associated with a second radio having a lower power consumption than a first radio at the UE, the configuration including a starting time for an operation of the first radio based on a reception of the wake-up signal; receive the wake-up signal via the second radio; and start the operation of the first radio at the starting time following the reception of the wake-up signal via the second radio. In one aspect, the LP-WUS configuration reception component 198 may be configured to receive a configuration for a wake-up signal associated with a second radio having a lower power consumption than a first radio at the UE; receive the wake-up signal via the second radio; and start, in response to the wake-up signal via the second radio, an operation via the first radio and concurrently monitoring for the wake-up signal via the second radio. In certain aspects, the base station 102 may include an LP-WUS configuration indication component 199. The LP-WUS configuration indication component 199 may be configured transmit, to a UE, a configuration for a wake-up signal associated with a second radio having a lower power consumption than a first radio at the UE, the configuration including a starting time for an operation of the first radio based on a reception of the wake-up signal; transmit the wake-up signal for the UE; and communicate with the UE based on the operation of the first radio at the starting time following the wake-up signal via the second radio. Although the following description may be focused on 5G NR, the concepts described herein may be applicable to other similar areas, such as LTE, LTE-A, CDMA, GSM, and other wireless technologies.

Figure 2:
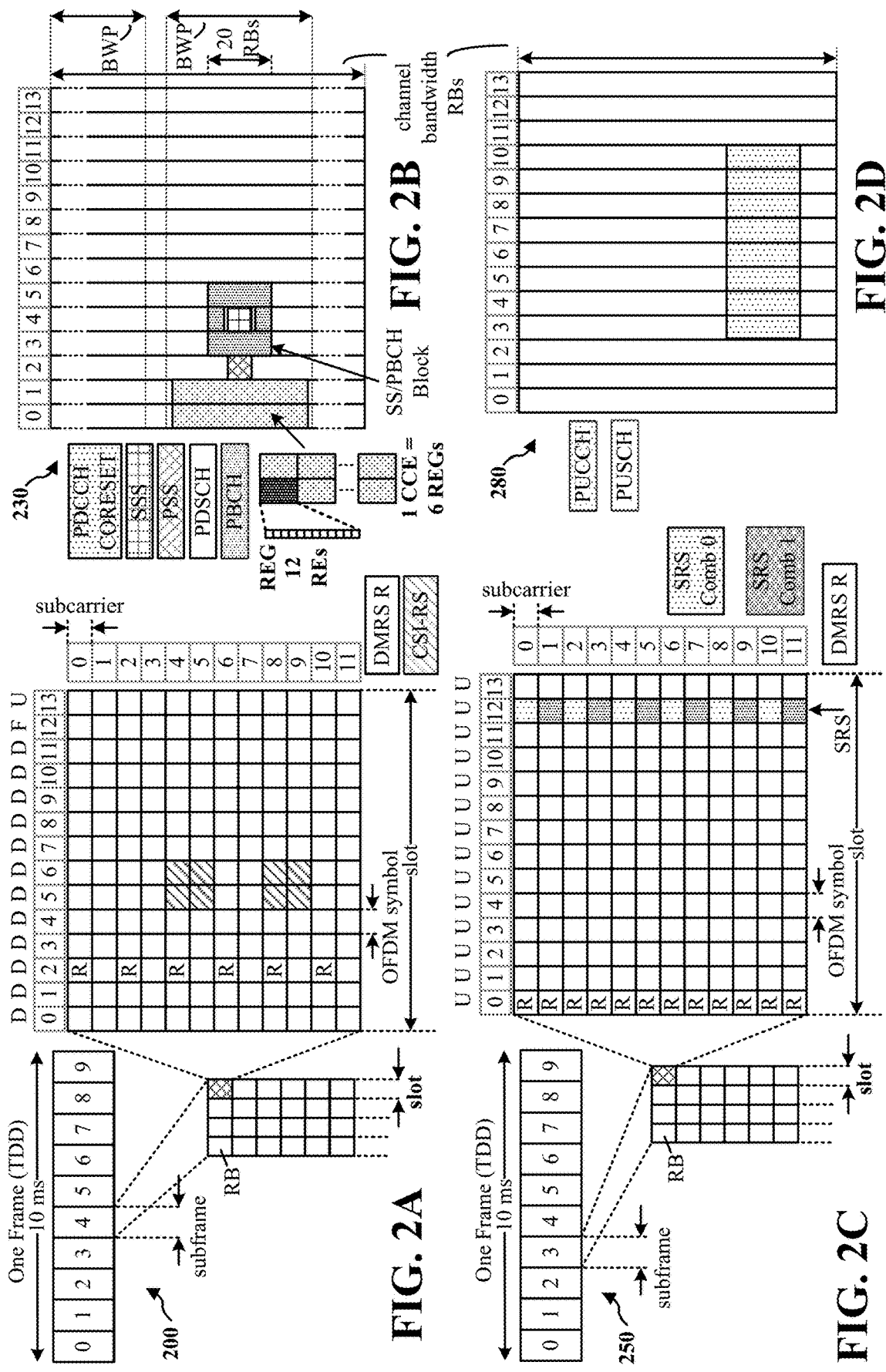
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
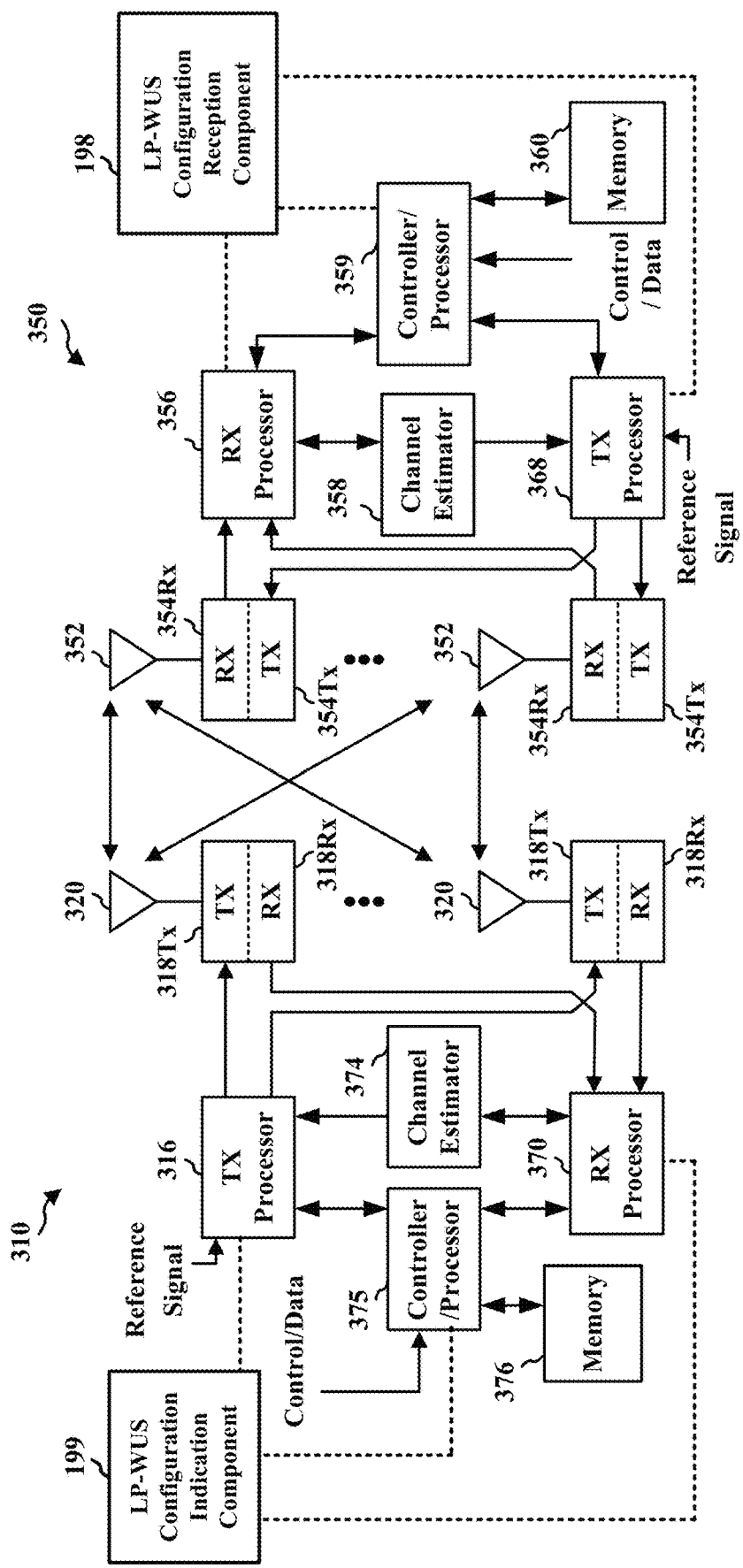
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the LP-WUS configuration reception component 198 of FIG. 1.

At least one of the TX processor 316, the RX processor 370, and the controller/processor 375 may be configured to perform aspects in connection with the LP-WUS configuration indication component 199 of FIG. 1.

In RRC idle and inactive states, radio resource management (RRM) and paging consume significant UE power. For example, in RRM, the UE periodically performs layer 3 reference signal received power (L3-RSRP) measurements on SSB s transmitted by a serving cell of the UE and neighbor cells of the UE. Such L3-RSPRP measurements consume power. In another example, in paging, the UE periodically monitors a paging occasion (PO) during each idle discontinuous reception (I-DRX) cycle. In a DRX mode, the UE may monitor a PDCCH channel discontinuously using a sleep and wake cycle, e.g., DRX OFF durations and DRX ON durations. When the UE is in an RRC-connected state, the DRX may also be referred to as Connected Mode DRX (C-DRX). If the UE is in an RRC idle state, the DRX may be referred to as I-DRX. In a non-DRX mode, the UE monitors for PDCCH in each subframe to check whether there is downlink data available. Continuous monitoring of the PDCCH uses more battery power at the UE, and DRX conserves battery power at the UE.

Figure 4:
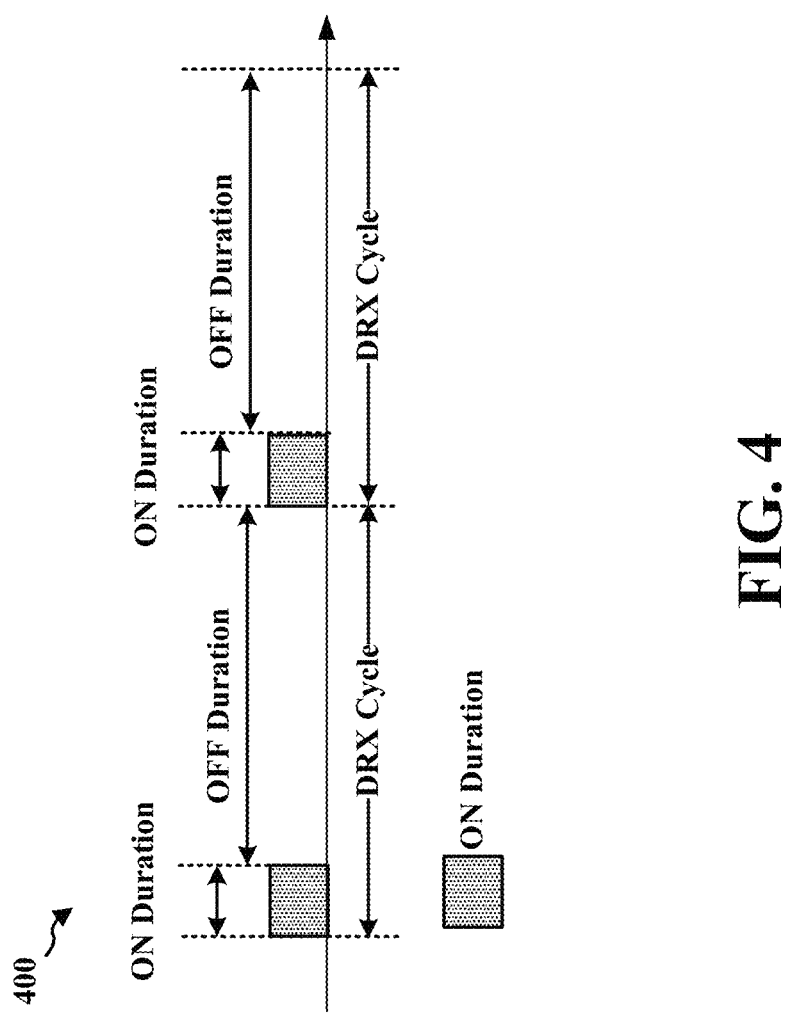
FIG. 4 is a diagram illustrating a discontinuous reception (DRX) cycle in wireless communication.

FIG. 4 illustrates an example of a DRX cycle 400 including periodic ON durations during which the UE monitors for PDCCH and OFF durations during which the UE may not monitor for the PDCCH. The OFF duration may be referred to as a DRX opportunity, in some aspects. During the OFF duration, the UE does not monitor for PDCCH. The UE may enter a sleep mode or a low power mode in which the UE minimizes power consumption by shutting down an RF function without detecting communication from the base station.

The base station may send a wake-up signal (WUS) to a UE in advance of a DRX ON duration when the base station will transmit communication to the UE. If the UE receives a WUS, the UE may wake-up by preparing to receive the communication during the DRX ON duration. If the UE does not receive a WUS, the UE may return to the sleep mode. A UE may be configured with resources to monitor for the WUS. When configured with such resources, the UE wakes up a configurable amount of time before a start of a DRX ON duration and checks, e.g., monitors, for the WUS. If the UE does not receive the WUS, the UE returns to sleep for the next DRX cycle. The use of WUSs may help to reduce power consumption for UEs, e.g., by allowing the UE to return to the sleep mode without monitoring for additional signaling. In some configurations, a WUS may be transmitted over the PDCCH (such a wakeup signal may be referred to as a PDCCH-WUS).

In some configurations, a UE may be equipped with a low power wakeup radio (LP-WUR) that utilizes less battery power than other radios (e.g., the main radio) of the UE. In an example, the LP-WUR may utilize less than 1 mA. The LP-WUR may be configured to receive a low power wakeup signal (LP-WUS). A UE that utilizes the LP-WUS for wakeup purposes may consume less power than a UE that utilizes the PDCCH-WUS for wakeup purposes. The LP-WUS may utilize a simplified modulation scheme in comparison to a WUS (e.g., which may be referred to as a higher power WUS). As an example, the LP-WUS may be based on an on-off keying (OOK) modulation scheme. The OOK modulation scheme may lead to a smaller payload size for an LP-WUS.

As illustrated in the diagram 500 in FIG. 5A, in some aspects, the UE 504 may include separate radios, e.g., different components, that the UE uses for the different measurements. For example, the UE 504 may use the high-power radio component(s) 506 for serving cell measurements and/or serving beam measurements. The UE 504 may use a different radio, e.g., the low-power radio component(s) 508 to perform measurements of the neighbor cells and/or non-serving beams.

In other aspects, as shown in the diagram 550 in FIG. 5B, the UE 514 may have shared radio component(s) 502 that are used for both the serving cell and the neighbor cells measurements and/or for the serving beam and non-serving beam measurements. However, different measurement configurations, e.g., different parameters, may be used by the shared radio component 502 to perform the different measurements.

In some aspects, the high-power radio component(s) 506 or the configuration for the serving cell/serving beam measurements performed by the shared radio component 502 may be more accurate, provide a higher level of gain, be more complex, and/or consume more power at the UE. The low-power radio component(s) 508 or the configuration for the neighbor cell/non-serving beam measurements performed by the shared radio component 502 may be less accurate, provide a lower level of gain, be less complex, and/or consume less power at the UE.

A UE may monitor for a PDCCH-based WUS outside the CDRX ON duration in a window of time before the ON duration starts. Within the ON duration, the benefits are reduced for using a non-scheduling PDCCH to indicate the UE to start monitoring the data scheduling PDCCH.

Figure 6:
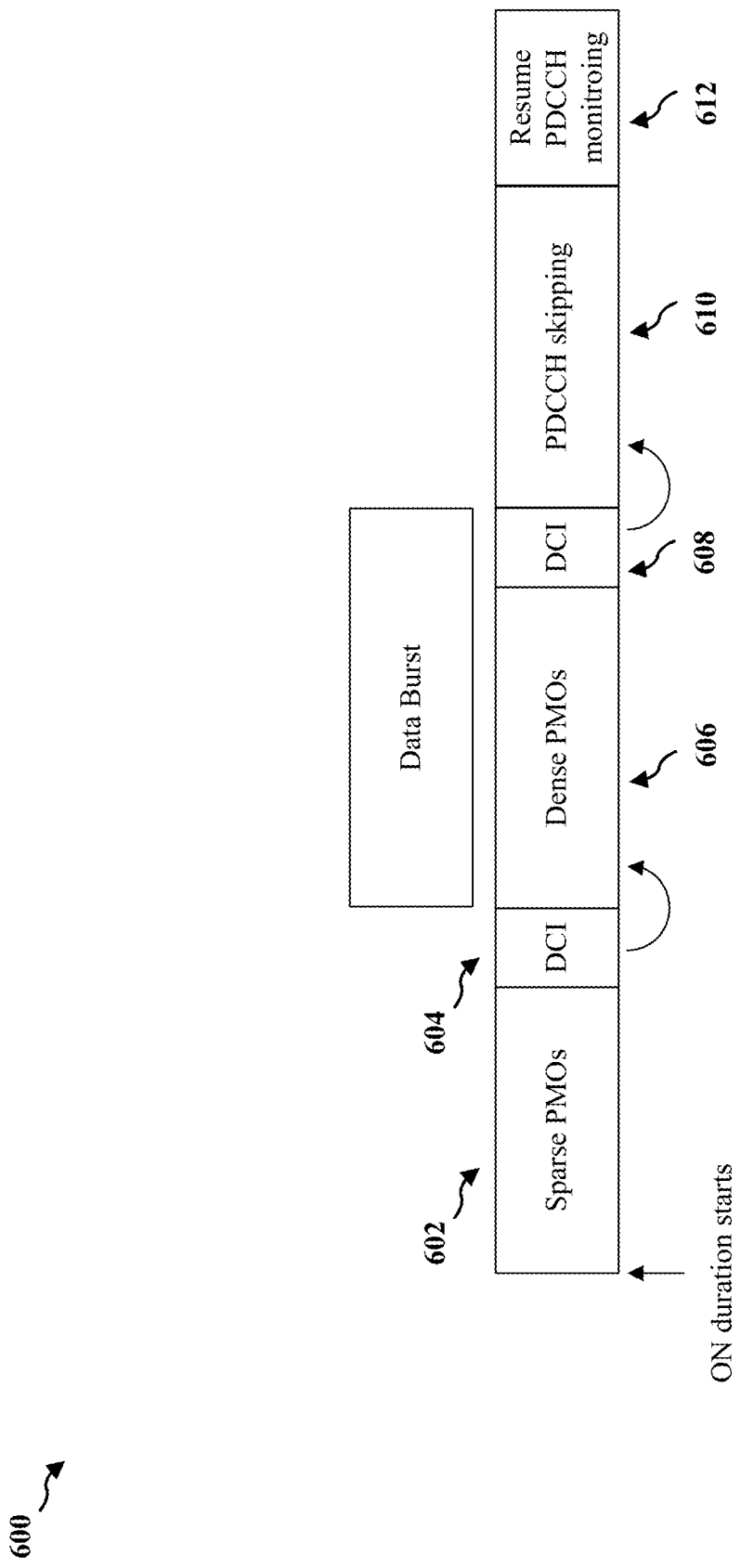
FIG. 6 is a diagram illustrating PDCCH monitoring for a UE.

FIG. 6 is a diagram 600 illustrating PDCCH monitoring for a UE. As shown in FIG. 6, a UE may start from monitoring sparse PDCCH monitor occasions (PMOs) 602 before the first scheduling DCI 604 is received, which indicates the UE to switch to monitor denser PMOs 606. At the last scheduling DCI 608 for the data burst, the DCI 608 may indicate the UE to skip PDCCH monitoring for a duration 610 (or switch to monitoring sparse PMOs). If a base station knows when to schedule the next data burst, the PDCCH skipping duration 610 may be set accurately so that a UE may immediately receive scheduling after it resumes PDCCH monitoring at 612. Otherwise, the UE may waste power without monitoring PDCCH. For better power savings, a UE may resume PDCCH monitoring from sparse monitoring around the time that the ON duration starts. This can lead to an increased transmission delay because the base station waits for the next PDCCH monitoring occasion in the PMOs.

Figure 7:
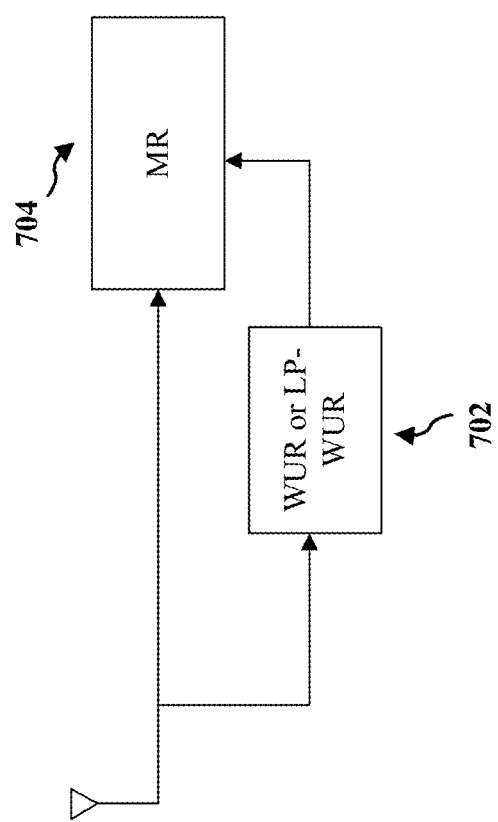
FIG. 7 is a diagram illustrating a low power wakeup radio (LP-WUR) accompanying a main radio (MR).

A lower power wakeup radio (LP-WUR) may be used for a companion radio monitoring a wake-up signal with very low power, e.g., less power than the main radio, while the main radio (MR) is in a deep sleep state. FIG. 7 is a diagram illustrating an LP-WUR and an MR. As shown in FIG. 7, the LP-WUR 702 may accompany an MR 704. The LP-WUR 702 may wake up the MR 704 for further data communication. The LP-WUR consumes lower power than the main radio by design. The LP-WUR may be powered separately by less power-hungry blocks. An LP-WUR may reduce the total power consumption as it can avoid unnecessary wake-up of the MR, which is very costly in terms of power consumption. An LP-WUR may reduce the average latency as it allows more frequent WUS monitoring due to its low power consumption.

An LP-WUS is a flexible solution for UE power savings and latency reduction. In one example, before every PDCCH monitoring occasion, a UE may first attempt to detect the LP-WUS to determine whether the UE is to activate the MR to receive PDCCH. Depending on the interval between operations in the MR, the MR may enter various states, such as deep sleep, light sleep or micro sleep states, and there is a transition time for the UE to get out of deep sleep and light sleep states.

When a UE monitors for the LP-WUS with an LP-WUR, the base station and the UE may use the same understanding on which sleep states (e.g., deep sleep, light sleep, or micro sleep states) the UE is in and when the UE may wake up the MR after it detects the LP-WUS in order to accurately communicate. PDCCH-based WUS does not take a UE's sleep state into account because when the UE starts to monitor PDCCH WUS, the receiver is already fully awake. Further transitioning into the DRX ON duration is similar to the wakeup from the micro sleep.

To wake up the MR quickly, various sleep states may be explicitly defined, for example, based on the sleep duration of the MR (or the base station may indicate the next sleep mode). Additionally, the UE's capability on the MR wakeup time after an LP-WUS may be detected and the UE's operation on MR wakeup, such as which hardware (HW) module to invoke, which signaling (e.g., PDCCH) to receive, may be determined.

The present disclosure presents methods and apparatus for LP-WUS monitoring and for concurrent LP-WUR and MR operations.

In one aspect, an LP-WUS may be monitored before a DRX ON duration start to replace the PDCCH WUS to achieve power savings outside DRX ON duration. The same principle may be applicable to a PDCCH monitoring window such as an extended reality (XR)-dedicated PDCCH monitoring window, which may be considered as a simplified version of CDRX Similar to the PDCCH WUS, an LP-WUS may indicate a UE whether to enter the DRX ON duration or the XR-dedicated PDCCH monitoring window.

Some wireless communication may include XR traffic, such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station. XR traffic may be transmitted from one UE and directed to another UE, in some aspects.

By monitoring an LP-WUS, the CDRX cycle or the XR-dedicated PDCCH monitoring window may be configured to be a floating window. For the CDRX cycle, a base station may configure the timer (e.g., the ON duration, the inactivity timer) without CDRX periodicity or the start offset, and the start of a CDRX ON duration may be indicated by an LP-WUS. For the XR-dedicated PDCCH monitoring window, a base station may configure the duration of the XR-dedicated PDCCH monitoring window without the periodicity or start offset, and the start of an XR-dedicated PDCCH monitoring window may be indicated by an LP-WUS.

XR applications introduce multi-media traffic subject to jitter. For example, an actual jitter range may be ±4 ms or larger. Mixture of XR and traditional data may create more random traffic patterns. LP-WUS monitoring may be further extended into the DRX ON and XR-dedicated windows. That is, an LP-WUS may be monitored anywhere. Enabling the LP-WUS monitoring, as described above, may include a PDCCH configuration, various sleep modes for the MR (e.g., the DRX OFF is a sleep duration), and LP-WUS-indicated MR operations. LP-WUS monitoring within the DRX ON or XR-dedicated window is similar to the LP-WUS monitoring outside the DRX ON or XR-dedicated window, except that there may be concurrent LP-WUR and MR operations for LP-WUS monitoring within the DRX ON or XR-dedicated windows.

Suppose that a UE monitors LP-WUS before every PDCCH monitoring occasion, the UE may simultaneously monitor LP-WUS and operate MR. The UE may simultaneously monitor LP-WUS and operate MR in different ways, depending on configuration and UE capability. In one configuration, a UE may simultaneously operate the LP-WUR and the MR. This configuration is applicable to UEs that have fully separated hardware for LP-WUR and MR. In another configuration, a UE may operate one of the LP-WUR and the MR at a time. This configuration is applicable to UEs that have shared hardware between LP-WUR and MR.

For the UEs that can operate one of the LP-WUR and the MR at a time, there are several options for the UE's operations. In one configuration, if the UE's MR is already awake as indicated by a WUS, and UE has missed a WUS conflicting with the MR operation, the UE may assume that the missed WUS would have indicated the UE to perform an associated MR operation.

In another configuration, if a UE's MR is already awake as indicated by a WUS, and UE has missed a WUS conflicting with the MR operation, the UE may assume the missed WUS was not transmitted by the base station or did not indicate the UE to operate the MR. The UE may return to monitor LP-WUS after it operates the MR based on an early detected LP-WUS. This leads to the down-sampling of WUS monitoring and MR operation.

In yet another configuration, if a UE's MR is already awake as indicated by a WUS, and UE has missed a WUS conflicting with the MR operation, the UE may treat the missed WUS differently depending on the priority of the corresponding MR operations. For a priority of the MR operation associated with the missed WUS that is higher than a threshold, the UE may assume the missed WUS would have indicated the UE to operate the MR. Otherwise, the UE may assume the missed WUS has not been transmitted by the base station or has not indicated for the UE to operate the MR. If multiple WUSs are missed due to conflict with the same MR operation, the UE may take, e.g., perform, the highest priority of MR operations associated with these WUSs.

FIG. 8A is a diagram 800 illustrating the concurrent MR and LP-WUR operations in accordance with one aspect of the present disclosure. In the example shown in FIG. 8A, the UE can simultaneously operate both the LP-WUR and the MR. Hence, all the WUS 802, 804, 806 may be received by, for example, the LP-WUR of the UE, and the UE may perform MR operation for MR 812, 814, 816. The UE may receive the WUS 804 while concurrently performing an MR operation at MR 812, and receive the WUS 806 while concurrently performing an MR operation at MR 814.

FIG. 8B is a diagram 820 illustrating the concurrent MR and LP-WUR operations in accordance with one aspect of the present disclosure. In the example shown in FIG. 8B, the UE can only operate one of the LP-WUR and MR at a time. Hence, some WUS (e.g., WUS 824, 826) are missed due to the conflict with the MR operation (e.g., MR 832, 834). In the example of FIG. 8B, the UE may assume that the missed WUS 824, 826 would have indicated the UE to perform associated MR operation (MR operations for MR 834, 836). Hence, the UE may perform these MR operations (MR operations for MR 834, 836), even though the corresponding WUS (i.e., WUS 824, 826) are missed.

FIG. 8C is a diagram 840 illustrating the concurrent MR and LP-WUR operations in accordance with one aspect of the present disclosure. In the example shown in FIG. 8C, the UE can only operate one of the LP-WUR and MR at a time. A WUS (i.e., WUS 844) is missed due to the conflict with the MR operation (i.e., MR 852). In the example of FIG. 8C, the UE may assume that the missed WUS 844 did not indicate the UE to perform the associated MR operation (i.e., the MR operation of MR 854). Hence, the UE may miss or skip the corresponding MR operation (i.e., the MR operation of MR 854).

The above options for determining the UE's behaviors for missed WUS are applicable to the scenarios where the base station is aware that there is a missed WUS detection. In some examples, the base station may not be aware of a missed WUS detection, e.g., due to a conflict (e.g., overlap in time) between the WUS and UE autonomous UL transmission, and the UE may assume the missed WUS has been sent by the base station. For example, the UE may perform the corresponding operation of the MR that is associated with the reception of the LP-WUS.

The WUS-indicated PDCCH monitoring operation may conflict with a PDCCH skipping indication a UE may receive (e.g., by PDCCH skipping indication in scheduling DCI received in MR). A UE may solve the potential conflict in several ways. In one configuration, if the PDCCH monitor occasions (PMO) for WUS-indicated PDCCH monitoring operation falls in the PDCCH skipping duration, the UE may not monitor the PDCCH (e.g., skip the PDCCH monitoring by ignoring the corresponding LP-WUS). In another configuration, if the PMO falls in the PDCCH skipping duration, a UE may monitor the PDCCH (e.g., for URLLC, or retransmission of failed PDSCH, by assuming the base station will still send the corresponding LP-WUS, and that the priority of the PDCCH is reduced or set to the minimum priority), e.g., starting the PDCCH monitoring as indicated by the LP-WUS. If a WUS conflicts with MR operation within the PDCCH skipping duration, the UE may, for example, assume that the WUS is not sent and may skip PDCCH monitoring.

The principles for resolving the conflict between a WUS-indicated PDCCH monitoring operation and a PDCCH skipping indication, as described above, are not limited to WUS-indicated PDCCH monitoring and can also be applied to other MR operations, such as SPS PDSCH, periodic CSI-RS, etc.

In some aspects, different priorities may be defined for different MR operations, such as PDCCH reception, SPS PDSCH, periodic CSI-RS, and the UE's behaviors with respect to the MR operations may be determined based on their priorities. In some aspects, separate WUS signals may be configured for different MR operations, and the UE's behaviors may depend on the WUS signal the UE receives.

Figures 9A, 9B:
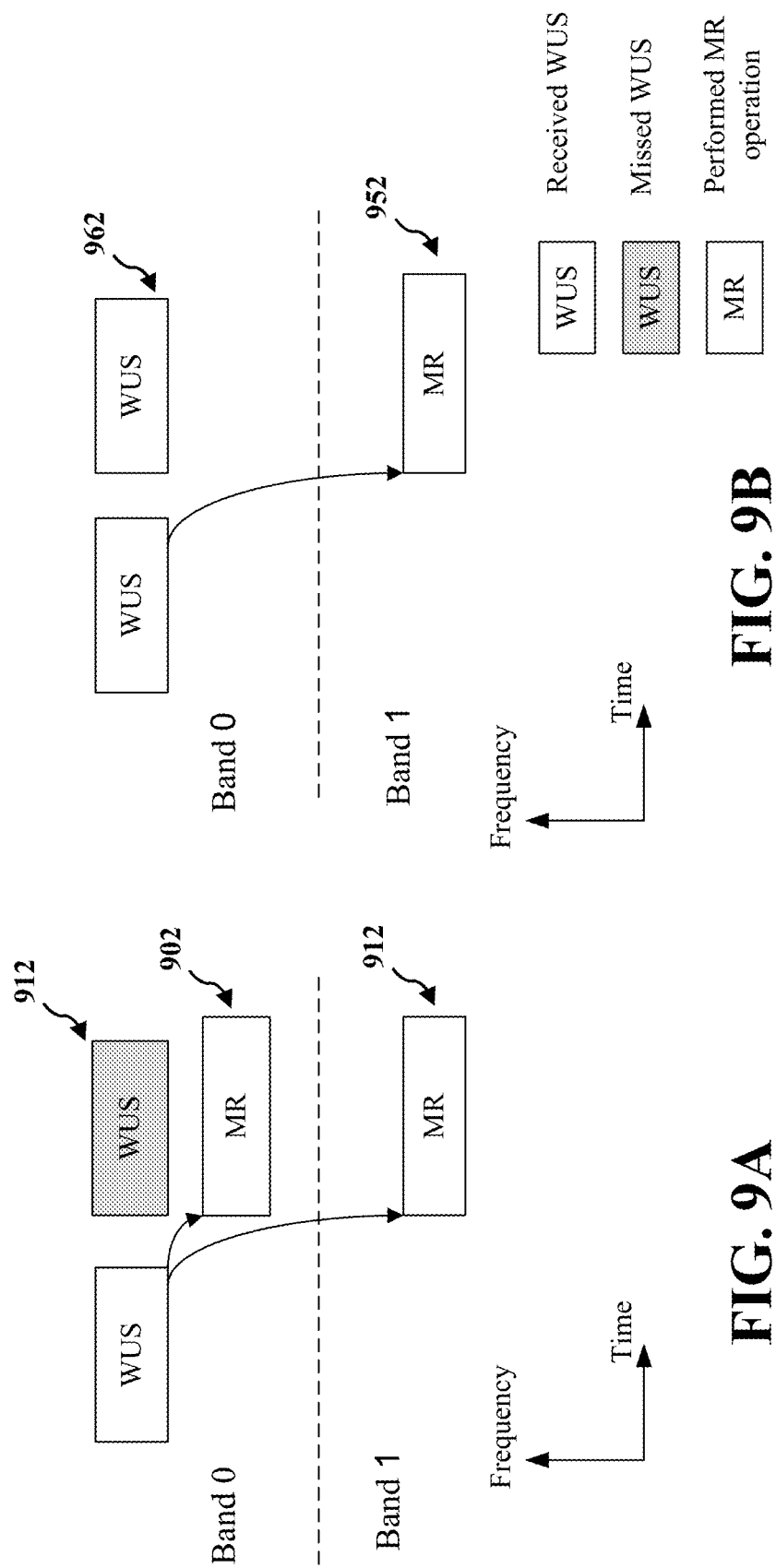
FIGS. 9A and 9B are diagrams illustrating the concurrent MR and LP-WUR operations in accordance with various aspects of the present disclosure.

In one configuration, for the UEs that can only operate one of the LP-WUR and MR at a time, the cross-band WUS indication may be utilized for MR operation, assuming within the same band, the UE does not operate WUR and MR simultaneously. FIGS. 9A and 9B are diagrams illustrating the concurrent MR and LP-WUR operations in accordance with various aspects of the present disclosure. As shown in FIG. 9A, if the UE operates an MR operation (i.e., MR 902) in band 0, the UE may not be able to monitor WUS (i.e., WUS 912) in Band 0 simultaneously if WUS 912 is only sent in Band 0. Hence, the UE may miss WUS 912 due to the conflict with MR 902, as shown in FIG. 9A. On the other hand, as shown in FIG. 9B, if there is no MR operation in Band 0, the UE may monitor WUS (i.e., WUS 962) in Band 0 even if there is simultaneous MR operation (i.e., MR 952) in Band 1. Using cross-band UWS indication may improve power saving without any impact on the inter-band MR.

Figure 10:
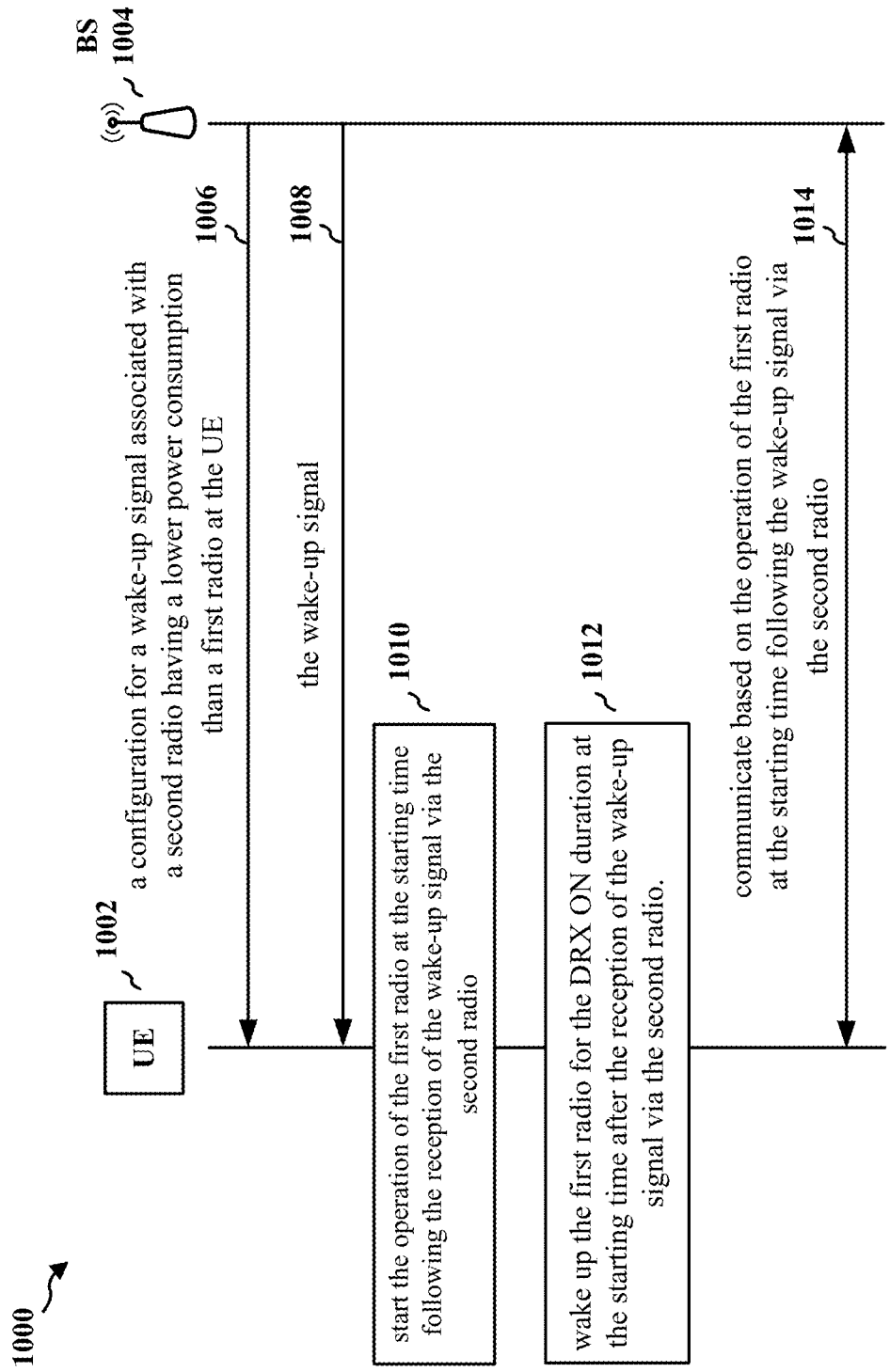
FIG. 10 is a first call flow diagram illustrating a method of wireless communication in accordance with various aspects of the present disclosure.

FIG. 10 is a call flow diagram 1000 illustrating a method of wireless communication in accordance with various aspects of this present disclosure. Although aspects are described for a base station 1004, the aspects may be performed by a base station in aggregation and/or by one or more components of a base station 1004 (e.g., such as a CU 110, a DU 130, and/or an RU 140).

As shown in FIG. 10, a UE 1002 may, at 1006, receive from a base station 1004 a configuration for a wake-up signal associated with a second radio having a lower power consumption than a first radio at the UE. The configuration may include a starting time for an operation of the first radio based on a reception of the wake-up signal.

At 1008, the UE 1002 may receive the wake-up signal via the second radio. At 1010, the UE 1002 may start the operation of the first radio at the starting time following the reception of the wake-up signal via the second radio.

In some aspects, the operation of the first radio may include DRX, and the configuration for the wake-up signal may include a DRX ON duration and a DRX inactivity window. When the UE 1002 starts, at 1010, the operation of the first radio at the starting time, the UE 1002 may monitor for a PDCCH using the first radio at the starting time after the reception of the wake-up signal via the second radio.

At 1012, the UE 1002 may wake up the first radio for the DRX ON duration at the starting time after the reception of the wake-up signal via the second radio.

At 1014, the UE 1002 and the base station 1004 may communicate based on the operation of the first radio at the starting time following the wake-up signal via the second radio.

In some aspects, the operation of the first radio may include a PDCCH monitoring window, and the configuration for the wake-up signal may include a duration for the PDCCH monitoring window. When the UE 1002 starts, at 1010, the operation of the first radio at the starting time, the UE 1002 may monitor for PDCCH during the PDCCH monitoring window using the first radio at the starting time after the reception of the wake-up signal via the second radio.

Figure 11:
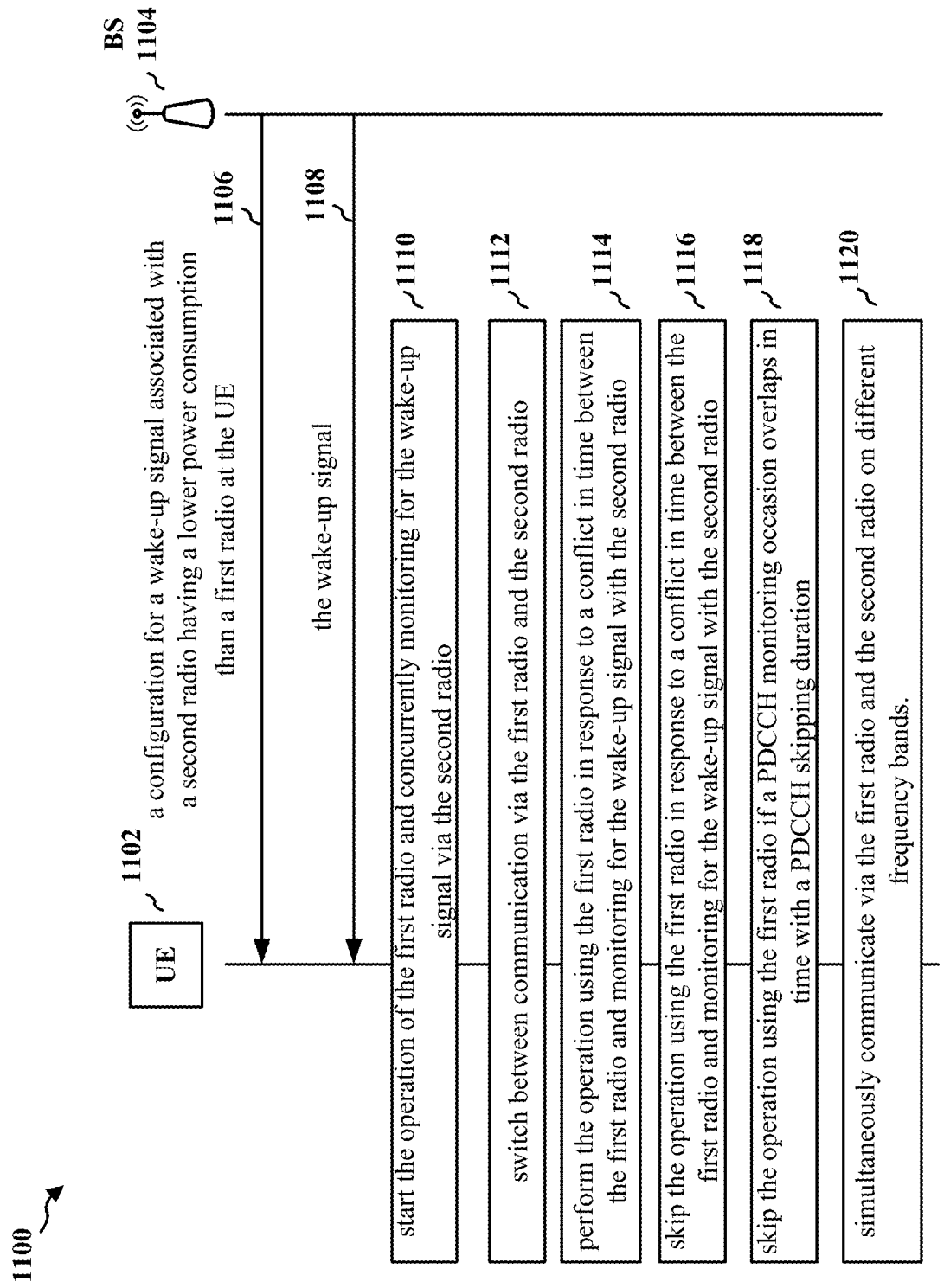
FIG. 11 is a second call flow diagram illustrating a method of wireless communication in accordance with various aspects of the present disclosure.

FIG. 11 is a call flow diagram 1100 illustrating a method of wireless communication in accordance with various aspects of this present disclosure. Although aspects are described for a base station 1104, the aspects may be performed by a base station in aggregation and/or by one or more components of a base station 1104 (e.g., such as a CU 110, a DU 130, and/or an RU 140).

As shown in FIG. 11, a UE 1102 may, at 1106, receive from a base station 1104 a configuration for a wake-up signal associated with a second radio having a lower power consumption than a first radio at the UE.

At 1108, the UE 1102 may receive the wake-up signal via the second radio. At 1110, the UE 1102 may start the operation of the first radio in response to the wake-up signal via the second radio and concurrently monitoring the wake-up signal via the second radio.

At 1112, the UE 1102 may switch between communication via the first radio and the second radio.

At 1114, the UE 1102 may perform the operation using the first radio in response to a conflict in time between the first radio and monitoring for the wake-up signal with the second radio. In some aspects, the UE 1102 may, at 1116, skip the operation using the first radio in response to a conflict in time between the first radio and monitoring for the wake-up signal with the second radio.

At 1118, the UE 1102 may skip the operation using the first radio if a PDCCH monitoring occasion overlaps in time with a PDCCH skipping duration.

At 1120, the UE 1102 may simultaneously communicate via the first radio and the second radio on different frequency bands.

Figure 12:
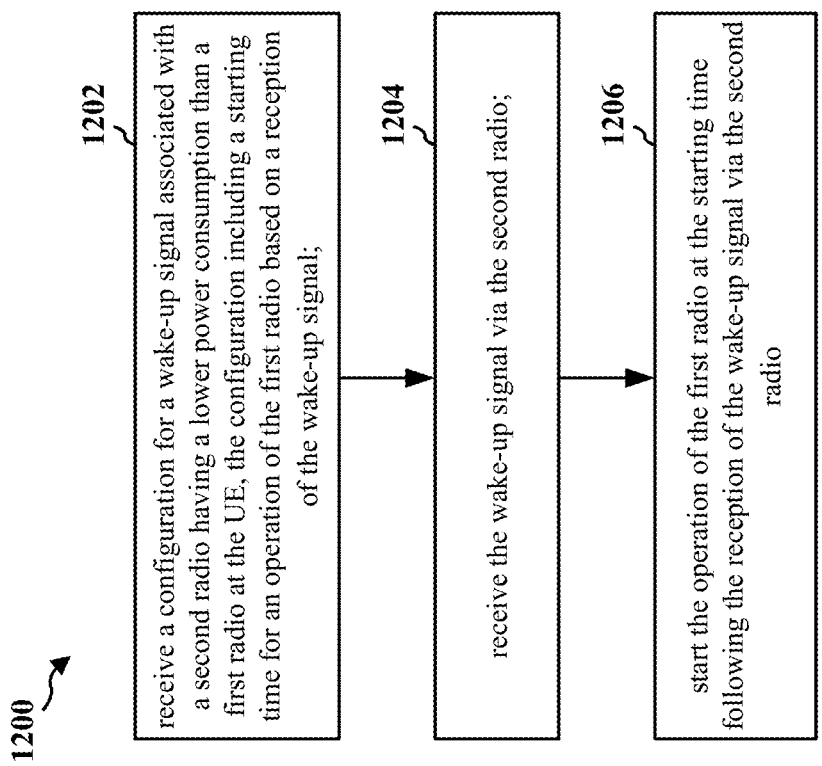
FIG. 12 is the first flowchart illustrating methods of wireless communication at a UE in accordance with various aspects of the present disclosure.

FIG. 12 is a flowchart 1200 illustrating methods of wireless communication at a UE in accordance with various aspects of the present disclosure. The method may be performed by a UE. The UE may be the UE 104, 350, 504, 514, 1002, 1102, or the apparatus 1504 in the hardware implementation of FIG. 15. The method enables floating CDRX and floating XR-dedicated PDCCH monitoring window through LP-WUS, and concurrent LP-WUR and MR operations. Thus, it improves the efficiency of wireless communication.

As shown in FIG. 12, at 1202, the UE may receive a configuration for a wake-up signal associated with a second radio having a lower power consumption than a first radio at the UE. The configuration may include a starting time for an operation of the first radio based on a reception of the wake-up signal. The UE may receive the configuration from a network entity. The network entity may be a base station, or a component of a base station, in the access network of FIG. 1 or a core network component (e.g., base station 102, 310, 1004, 1104; or the network entity 1502 in the hardware implementation of FIG. 15). FIGS. 5A, 5B, 10 and 11 illustrate various aspects of the steps in connection with flowchart 1200. For example, referring to FIG. 10, the UE 1002 may receive, at 1006, a configuration for a wake-up signal associated with a second radio having a lower power consumption than a first radio from the base station 1004. Referring to FIG. 5A, the first radio may be the high-power radio component(s) 506 of the UE 504, and the second radio may be the low-power radio component(s) 508 of the UE 504.

At 1204, the UE may receive the wake-up signal via the second radio. For example, referring to FIGS. 5A and 10, the UE 1002 may receive, at 1008, the wake-up signal via the second radio (508).

At 1206, the UE may start the operation of the first radio at the starting time following the reception of the wake-up signal via the second radio. For example, referring to FIGS. 5A and 10, the UE 1002 may, at 1010, start the operation of the first radio (506) at the starting time following the reception of the wake-up signal, at 1008, via the second radio (508).

In some aspects, the operation of the first radio may include DRX, and the configuration for the wake-up signal may include a DRX ON duration and a DRX inactivity window. To start the operation, the UE may monitor for a PDCCH using the first radio at the starting time after the reception of the wake-up signal via the second radio. For example, referring to FIGS. 5A and 10, when the UE 1002 starts, at 1010, the operation of the first radio (506), the operation of the first radio (506) may include DRX, and the configuration for the wake-up signal the UE 1002 receives, at 1006, may include a DRX ON duration and a DRX inactivity window. To start the operation, at 1010, the UE 1002 may monitor for a PDCCH using the first radio (506) at the starting time after the reception of the wake-up signal via the second radio (508) at 1008.

In some aspects, the UE may wake up the first radio for the DRX ON duration at the starting time after the reception of the wake-up signal via the second radio. For example, referring to FIGS. 5A and 10, at 1012, the UE 1002 may wake up the first radio (506) for the DRX ON duration at the starting time after the reception of the wake-up signal via the second radio (508) at 1008.

In some aspects, the operation of the first radio may include a PDCCH monitoring window, and the configuration for the wake-up signal may include a duration for the PDCCH monitoring window. To start the operation, the UE may monitor for PDCCH during the PDCCH monitoring window using the first radio at the starting time after the reception of the wake-up signal via the second radio. For example, referring to FIGS. 5A and 10, the operation of the first radio (506) may include a PDCCH monitoring window, and the configuration for the wake-up signal the UE 1002 receives, at 1006, may include a duration for the PDCCH monitoring window. To start the operation, at 1010, the UE 1002, may monitor for PDCCH during the PDCCH monitoring window using the first radio (506) at the starting time after the reception of the wake-up signal via the second radio (508) at 1008.

In some aspects, the PDCCH monitoring window may be dedicated to an XR service. In some aspects, the configuration may not include a periodicity for the operation and may not include a start offset associated with a periodicity for the operation. For example, referring to FIG. 10, when the UE 1002 receives the configuration, at 1006, the configuration may not include a periodicity for the operation (that the UE 1002 starts at 1010) and may not include a start offset associated with a periodicity for the operation (that the UE 1002 starts at 1010).

Figure 13:
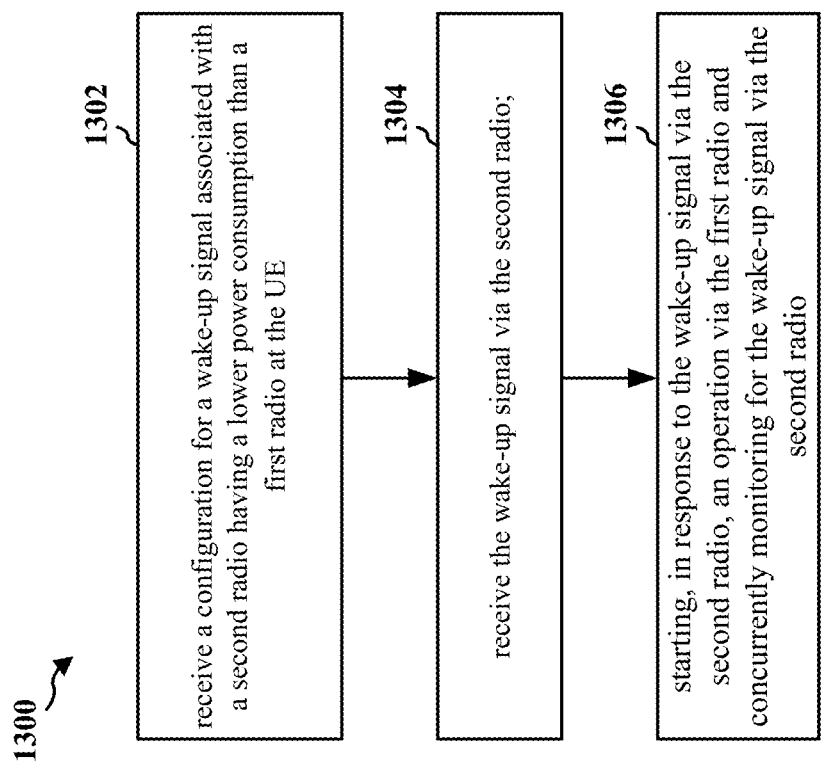
FIG. 13 is the second flowchart illustrating methods of wireless communication at a UE in accordance with various aspects of the present disclosure.

FIG. 13 is a flowchart 1300 illustrating methods of wireless communication at a UE in accordance with various aspects of the present disclosure. The method may be performed by a UE. The UE may be the UE 104, 350, 504, 514, 1002, 1102, or the apparatus 1504 in the hardware implementation of FIG. 15. The method enables floating CDRX and floating XR-dedicated PDCCH monitoring window through LP-WUS, and concurrent LP-WUR and MR operations. Thus, it improves the efficiency of wireless communication.

As shown in FIG. 13, at 1302, the UE may receive a configuration for a wake-up signal associated with a second radio having a lower power consumption than a first radio at the UE. The UE may receive the configuration from a network entity. The network entity may be a base station, or a component of a base station, in the access network of FIG. 1 or a core network component (e.g., base station 102, 310, 1004, 1104; or the network entity 1502 in the hardware implementation of FIG. 15). FIGS. 5A, 5B, 8A-8C, 9A, 9B, 10 and 11 illustrate various aspects of the steps in connection with flowchart 1300. For example, referring to FIG. 11, the UE 1102 may receive, at 1106, a configuration for a wake-up signal associated with a second radio having a lower power consumption than a first radio from the base station 1104. Referring to FIG. 5A, the first radio may be the high-power radio component(s) 506 of the UE 504, and the second radio may be the low-power radio component(s) 508 of the UE 504.

At 1304, the UE may receive the wake-up signal via the second radio. For example, referring to FIGS. 5A and 11, the UE 1102 may receive, at 1108, the wake-up signal via the second radio (508).

At 1306, the UE may start, in response to the wake-up signal via the second radio, an operation via the first radio and concurrently monitoring for the wake-up signal via the second radio. For example, referring to FIGS. 5A and 11, the UE 1102 may, at 1110, start the operation of the first radio (506) and concurrently monitoring for the wake-up signal via the second radio (508).

In some aspects, the UE may switch between communication via the first radio and the second radio. For example, referring to FIGS. 5A and 11, the UE 1102 may, at 1112, switch between communication via the first radio (506) and the second radio (508).

In some aspects, the UE may further perform the operation using the first radio in response to a conflict in time between the first radio and monitoring for the wake-up signal with the second radio. For example, referring to FIGS. 5A and 11, the UE 1102 may, at 1114, perform the operation using the first radio in response to a conflict in time between the first radio (506) and monitoring for the wake-up signal with the second radio (508). For example, referring to FIG. 8B, the UE may perform the operation 834, 836 using the first radio (MR) in response to a conflict in time between the first radio (832, 834) and monitoring for the wake-up signal (824, 826) with the second radio.

In some aspects, the UE may skip the operation using the first radio in response to a conflict in time between the first radio and monitoring for the wake-up signal with the second radio. For example, referring to FIGS. 5A, 11, the UE 1102 may, at 1116, skip the operation using the first radio (506) in response to a conflict in time between the first radio (506) and monitoring for the wake-up signal with the second radio (508). Referring to FIG. 8C, the UE may skip the operation (854) using the first radio in response to a conflict in time between the first radio (852) and monitoring for the wake-up signal (844) with the second radio.

In some aspects, the UE may perform the operation using the first radio in response to a conflict in time between the first radio and monitoring for the wake-up signal with the second radio, and a priority of the operation meeting a threshold. Alternatively, the UE may skip the operation using the first radio in response to the conflict in time between the first radio and the monitoring for the wake-up signal with the second radio, and the priority of the operation not meeting the threshold. For example, referring to FIGS. 8B and 8C, the UE may perform the operation 834, 836 using the first radio in response to a conflict in time between the first radio (832, 834) and monitoring for the wake-up signal (824, 826) with the second radio, and a priority of the operation (834, 836) meeting a threshold. Alternatively, the UE may skip the operation (854) using the first radio in response to the conflict in time between the first radio (852) and the monitoring for the wake-up signal (844) with the second radio, and the priority of the operation (854) not meeting the threshold.

In some aspects, the UE may perform the operation based on the highest priority among the priorities of multiple operations using the first radio in response to a conflict in time between the communication via the first radio and monitoring, via the second radio, wake-up signal occasions associated with the multiple operations. For example, referring to FIG. 8B, the UE may perform the operation 834, 836 based on the highest priority among the priorities of multiple operations (834, 836, etc.) using the first radio in response to a conflict in time between the communication (832, 834) via the first radio and monitoring, via the second radio, wake-up signal occasions (824, 826) associated with the multiple operations.

In some aspects, the UE may perform the operation using the first radio in response to a conflict in time between the first radio and monitoring for the wake-up signal with the second radio, and based on the conflict not being known to a network entity. Alternatively, the UE may skip the operation using the first radio in response to the conflict in time between the communication via the first radio and the monitoring for the wake-up signal with the second radio, and based on the conflict being known to the network entity. For example, referring to FIG. 8B, the UE may perform the operation 834, 836 using the first radio in response to a conflict in time between the first radio (832, 834) and monitoring for the wake-up signal (824, 826) with the second radio, and based on the conflict (e.g., the conflict of WUS 824 and MR 832, the conflict of WUS 826 and MR 834) not being known to a network entity. Alternatively, the UE may skip the operation 834, 836 using the first radio in response to the conflict in time between the communication (832, 834) via the first radio and the monitoring for the wake-up signal (824, 826) with the second radio, and based on the conflict (e.g., the conflict of WUS 824 and MR 832, and the conflict of WUS 826 and MR 834) being known to the network entity.

In some aspects, the UE may skip the operation using the first radio if a PDCCH monitoring occasion overlaps in time with a PDCCH skipping duration. In some aspects, the UE may monitor for PDCCH based on a reduced priority if the PDCCH monitoring occasion overlaps in time with the PDCCH skipping duration. For example, referring to FIG. 11, the UE 1102 may skip, at 1118, the operation using the first radio if a PDCCH monitoring occasion overlaps in time with a PDCCH skipping duration.

In some aspects, the UE may switch between the communication via the first radio and the second radio for a first frequency band, and the method may further include: simultaneously communicating via the first radio and the second radio on different frequency bands. For example, referring to FIGS. 5A and 11, the UE 1102 may, at 1120, simultaneously communicate via the first radio (506) and the second radio (508) on different frequency bands. Referring to FIG. 9B, the UE may simultaneously communicate via the first radio (MR 952) and the second radio (WUS 962) on different frequency bands (MR 952 at Band 1, WUS 962 at Band 0).

In some aspects, the operation may include one or more of a PDCCH reception, a semi-persistent PDSCH reception, or a periodic CSI-RS reception. For example, referring to FIG. 11, when the UE 1102 starts, at 1110, the operation of the first radio, the operation may include one or more of a PDCCH reception, a semi-persistent PDSCH reception, or a periodic CSI-RS reception.

In some aspects, the UE may receive multiple configurations, including the configuration, for multiple wake-up signals associated with the second radio, each of the multiple configurations associated with one of multiple operations of the first radio based on the reception of a corresponding wake-up signal at the second radio. For example, referring to FIGS. 5A and 11, the UE 1102 may receive, at 1106, multiple configurations, including the configuration, for multiple wake-up signals associated with the second radio (508). Each of the multiple configurations (received at 1106) may be associated with one of multiple operations of the first radio based on the reception of a corresponding wake-up signal at the second radio (508).

Figure 14:
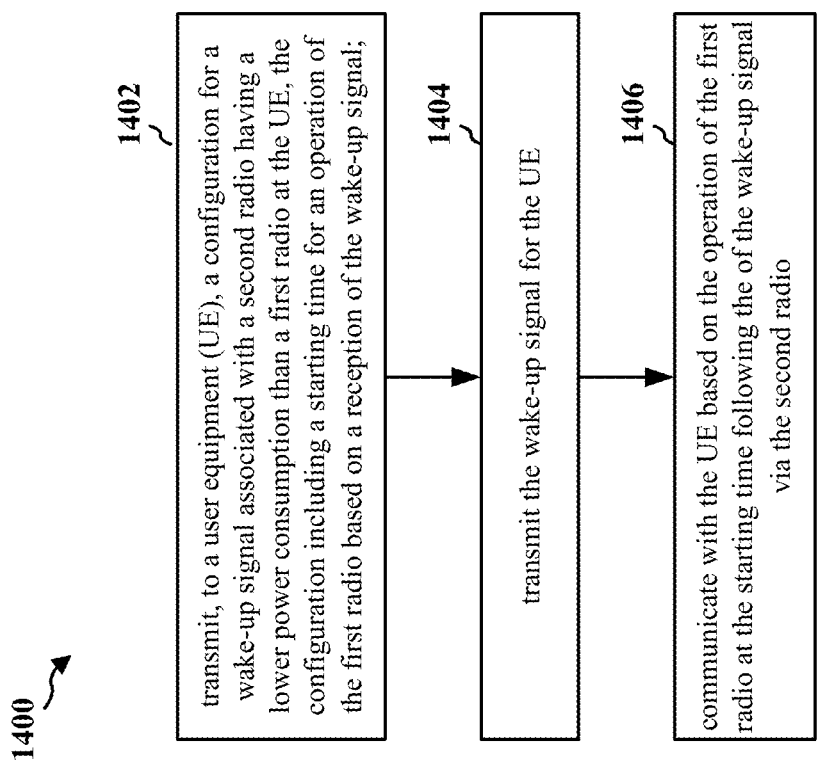
FIG. 14 is the first flowchart illustrating methods of wireless communication at a network entity in accordance with various aspects of the present disclosure.

FIG. 14 is a flowchart 1400 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 1004, 1104; or the network entity 1502 in the hardware implementation of FIG. 15). The method enables floating CDRX and floating XR-dedicated PDCCH monitoring window through LP-WUS, and concurrent LP-WUR and MR operations. Thus, it improves the efficiency of wireless communication.

As shown in FIG. 14, at 1402, the network entity may transmit, to a UE, a configuration for a wake-up signal associated with a second radio having a lower power consumption than a first radio at the UE. The configuration may include a starting time for an operation of the first radio based on a reception of the wake-up signal. The UE may be the UE 104, 350, 504, 514, 1002, 1102, or the apparatus 1504 in the hardware implementation of FIG. 15. FIGS. 5A, 5B, 8A-8C, 9A, 9B, 10, 11 illustrate various aspects of the steps in connection with flowchart 1400. For example, referring to FIGS. 5A and 10, the network entity (base station 1004) may transmit, at 1006, to a UE 1002, a configuration for a wake-up signal associated with a second radio (508) having a lower power consumption than a first radio (506) at the UE 1002. The configuration may include a starting time for an operation of the first radio (506) based on a reception of the wake-up signal.

At 1404, the network entity may transmit the wake-up signal for the UE. For example, referring to FIG. 10, the network entity (base station 1004) may transmit, at 1008, the wake-up signal for the UE 1002.

At 1406, the network entity may communicate with the UE based on the operation of the first radio at the starting time following the of the wake-up signal via the second radio. For example, referring to FIGS. 5A and 10, the network entity (base station 1004) may communicate, at 1014, with the UE 1002 based on the operation of the first radio (506) at the starting time following the of the wake-up signal via the second radio (508).

In some aspects, the operation of the first radio may include DRX, and the configuration for the wake-up signal may include a DRX ON duration and a DRX inactivity window. To communicate with the UE based on the operation, the network entity may transmit a PDCCH wake-up signal using the first radio at the starting time after the reception of the wake-up signal via the second radio. For example, referring to FIGS. 5A and 10, the operation of the first radio (506) may include DRX, and the configuration for the wake-up signal may include a DRX ON duration and a DRX inactivity window. To communicate, at 1014, with the UE 1002, based on the operation, the network entity (base station 1004) may transmit a PDCCH wake-up signal using the first radio (506) at the starting time after the reception of the wake-up signal via the second radio (508).

In some aspects, the operation of the first radio may include a PDCCH monitoring window, and the configuration for the wake-up signal may include a duration for the PDCCH monitoring window. To communicate with the UE based on the operation, the network entity may transmit for PDCCH during the PDCCH monitoring window using the first radio at the starting time after the reception of the wake-up signal via the second radio. For example, referring to FIGS. 5A and 10, the operation of the first radio (506) may include a PDCCH monitoring window, and the configuration for the wake-up signal, transmitted at 1008, may include a duration for the PDCCH monitoring window. To communicate, at 1014, with the UE 1002, based on the operation, the network entity (base station 1004) may transmit for PDCCH during the PDCCH monitoring window using the first radio (506) at the starting time after the reception of the wake-up signal via the second radio (508), at 1008.

In some aspects, the network entity may schedule the UE to communicate via the first radio during one or more occasions configured for wake-up signal monitoring via the second radio. For example, referring to FIG. 8B, the network entity may schedule the UE to communicate via the first radio during one or more occasions (834) configured for wake-up signal monitoring (826) via the second radio (508).

In some aspects, the network entity may configure the UE to switch between communication via the first radio and the second radio. For example, referring to FIGS. 5A and 11, the network entity (base station 1104) may configure the UE to switch, at 1112, between communication via the first radio (506) and the second radio (508).

In some aspects, the network entity may communicate with the UE based on the operation in response to a conflict in time between communication with the first radio of the UE and a wake-up signal occasion for the second radio. For example, referring to FIGS. 5A and 8B, the network entity may communicate with the UE based on the operation in response to a conflict in time between communication (834) with the first radio (506) of the UE and a wake-up signal occasion (826) for the second radio (508).

In some aspects, the network entity may skip the communication based on the operation in response to a conflict in time between the communication with the first radio of the UE and a wake-up signal occasion for the second radio. For example, referring to FIGS. 5A and 8C, the network entity may skip the communication (854) based on the operation in response to a conflict in time between the communication (854) with the first radio (506) of the UE and a wake-up signal occasion (846) for the second radio (508).

In some aspects, the network entity may communicate with the UE or skip communication with the UE based on the operation using the first radio in response to a conflict in time between the first radio and monitoring for the wake-up signal with the second radio, and based on a priority of the operation meeting a threshold. For example, referring to FIGS. 5A and 8B, the network entity may communicate with the UE to skip communication with the UE based on the operation using the first radio (506) in response to a conflict in time between the first radio (834) and monitoring for the wake-up signal (826) with the second radio (508), and based on a priority of the operation meeting a threshold.

In some aspects, the network entity may configure the UE to switch between the communication via the first radio and the second radio for a first frequency band. The network entity may configure the UE for simultaneous communication via the first radio and the second radio on different frequency bands. For example, referring to FIG. 9A, the network entity may configure the UE to switch between the communication via the first radio and the second radio for a first frequency band (Band 0). Referring to FIG. 9B, the network entity may configure the UE for simultaneous communication via the first radio and the second radio on different frequency bands (WUS 962 at Band 0, and MR 952 at Band 1).

In some aspects, the operation may include one or more of a PDCCH reception, a semi-persistent PDSCH reception, or a periodic CSI-RS reception. For example, referring to FIG. 10, the operation the UE 1002 starts, at 1010, may include one or more of a PDCCH reception, a semi-persistent PDSCH reception, or a periodic CSI-RS reception.

In some aspects, the network entity may configure multiple configurations for the UE, including the configuration, for multiple wake-up signals associated with the second radio, each of the multiple configurations including a corresponding starting time for one of multiple operations of the first radio based on the reception of a corresponding wake-up signal. For example, referring to FIGS. 5A and 10, the network entity (base station 1004 may configure, at 1006, multiple configurations for the UE 1002, including the configuration, for multiple wake-up signals associated with the second radio (508). Each of the multiple configurations (configured at 1006) may include a corresponding starting time for one of multiple operations of the first radio (506) based on the reception of a corresponding wake-up signal, at 1008, at the second radio (508).

Figure 15:
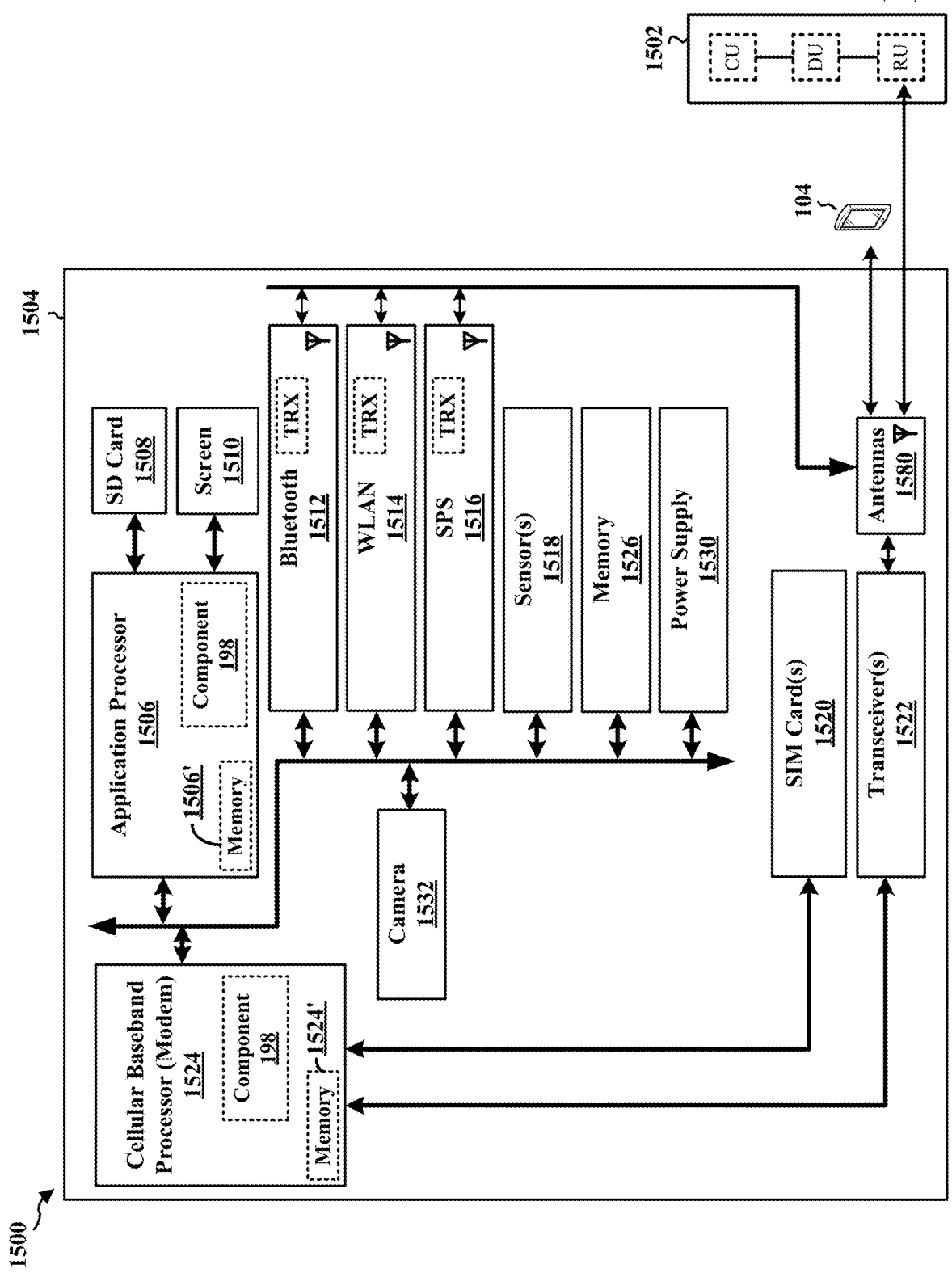
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, in one configuration, the component 198 is configured to receive a configuration for a wake-up signal associated with a second radio having a lower power consumption than a first radio at the UE. The configuration may include a starting time for an operation of the first radio based on a reception of the wake-up signal. The component 198 is further configured to receive the wake-up signal via the second radio; and start the operation of the first radio at the starting time following the reception of the wake-up signal via the second radio. In another configuration, the component 198 may be configured to receive a configuration for a wake-up signal associated with a second radio having a lower power consumption than a first radio at the UE; receive the wake-up signal via the second radio; and start, in response to the wake-up signal via the second radio, an operation via the first radio and concurrently monitoring for the wake-up signal via the second radio. The component 198 may be further configured to perform any of the aspects described in connection with the flowcharts in FIG. 12 and FIG. 13, and/or performed by the UE 1002, 1102 in FIG. 10, and FIG. 11, respectively. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving a configuration for a wake-up signal associated with a second radio having a lower power consumption than a first radio at the UE, the configuration including a starting time for an operation of the first radio based on a reception of the wake-up signal; receiving the wake-up signal via the second radio; and starting the operation of the first radio at the starting time following the reception of the wake-up signal via the second radio. The apparatus _h1_04 may include means for receiving a configuration for a wake-up signal associated with a second radio having a lower power consumption than a first radio at the UE; receiving the wake-up signal via the second radio; and starting, in response to the wake-up signal via the second radio, an operation via the first radio and concurrently monitoring for the wake-up signal via the second radio. The apparatus 1504 may further include means for performing any of the aspects described in connection with the flowcharts in FIG. 12 and FIG. 13, and/or aspects performed by the UE 1002, 1102 in FIG. 10 and FIG. 11, respectively. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
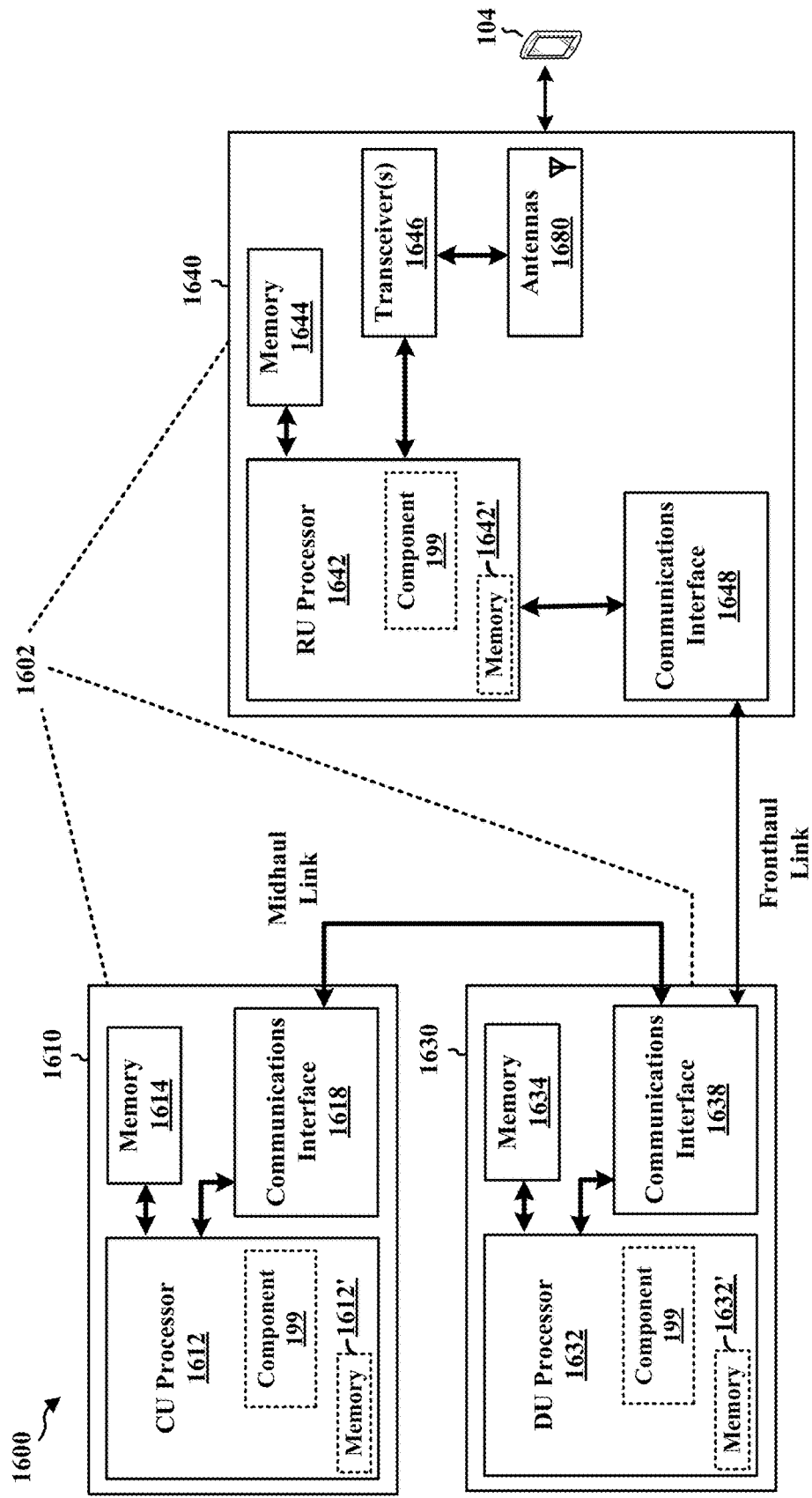
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, to a UE, a configuration for a wake-up signal associated with a second radio having a lower power consumption than a first radio at the UE, the configuration including a starting time for an operation of the first radio based on a reception of the wake-up signal; transmit the wake-up signal for the UE; and communicate with the UE based on the operation of the first radio at the starting time following the wake-up signal via the second radio. The component 199 may be further configured to perform any of the aspects described in connection with the flowchart in FIG. 14, and/or performed by the base station 1004 in FIG. 10. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting, to a user equipment (UE), a configuration for a wake-up signal associated with a second radio having a lower power consumption than a first radio at the UE, the configuration including a starting time for an operation of the first radio based on a reception of the wake-up signal; transmitting the wake-up signal for the UE; and communicating with the UE based on the operation of the first radio at the starting time following the wake-up signal via the second radio. The network entity 1602 may further include means for performing any of the aspects described in connection with the flowchart in FIG. 14, and/or aspects performed by the base station 1004, 1104 in FIG. 10 and FIG. 11, respectively. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving a configuration for a wake-up signal associated with a second radio having a lower power consumption than a first radio at the UE, the configuration including a starting time for an operation of the first radio based on a reception of the wake-up signal; receiving the wake-up signal via the second radio; and starting the operation of the first radio at the starting time following the reception of the wake-up signal via the second radio. The method enables floating CDRX and floating XR-dedicated PDCCH monitoring window through LP-WUS, and concurrent LP-WUR and MR operations. Thus, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving a configuration for a wake-up signal associated with a second radio having a lower power consumption than a first radio at the UE. The configuration includes a starting time for an operation of the first radio based on a reception of the wake-up signal. The method further includes receiving the wake-up signal via the second radio and starting the operation of the first radio at the starting time following the reception of the wake-up signal via the second radio.

Aspect 2 is the method of aspect 1, where the operation of the first radio includes DRX, and the configuration for the wake-up signal includes a DRX ON duration and a DRX inactivity window, and starting the operation includes: monitoring for a PDCCH using the first radio at the starting time after the reception of the wake-up signal via the second radio.

Aspect 3 is the method of any of aspects 1 to 2, where the method further includes waking up the first radio for the DRX ON duration at the starting time after the reception of the wake-up signal via the second radio.

Aspect 4 is the method of aspect 1, where the operation of the first radio includes a PDCCH monitoring window, and the configuration for the wake-up signal includes a duration for the PDCCH monitoring window, and starting the operation includes: monitoring for PDCCH during the PDCCH monitoring window using the first radio at the starting time after the reception of the wake-up signal via the second radio.

Aspect 5 is the method of aspect 4, wherein the PDCCH monitoring window is dedicated to an XR service.

Aspect 6 is the method of any of aspects 1 to 5, where the configuration does not include a periodicity for the operation and does not include a start offset associated with a periodicity for the operation.

Aspect 7 is an apparatus for wireless communication at a UE, including: a memory; and at least one processor coupled to the memory and, based at least in part on information stored in the memory, the at least one processor is configured to perform the method of any of aspects 1-6.

Aspect 8 is an apparatus for wireless communication including means for implementing the method of any of aspects 1-6.

Aspect 9 is a computer-readable medium (e.g., a non-transitory computer-readable medium) storing computer executable code, where the code when executed by a processor causes the processor to implement the method of any of aspects 1-6.

Aspect 10 is a method of wireless communication at a UE. The method includes receiving a configuration for a wake-up signal associated with a second radio having a lower power consumption than a first radio at the UE; receiving the wake-up signal via the second radio; and starting, in response to the wake-up signal via the second radio, an operation via the first radio and concurrently monitoring for the wake-up signal via the second radio.

Aspect 11 is the method of aspect 10, where the method further includes switching between communication via the first radio and the second radio.

Aspect 12 is the method of aspect 11, where the method further includes performing the operation using the first radio in response to a conflict in time between the first radio and monitoring for the wake-up signal with the second radio.

Aspect 13 is the method of aspect 11, where the method further includes skipping the operation using the first radio in response to a conflict in time between the first radio and monitoring for the wake-up signal with the second radio.

Aspect 14 is the method of aspect 11, where the method further includes performing the operation using the first radio in response to a conflict in time between the first radio and monitoring for the wake-up signal with the second radio, and a priority of the operation meeting a threshold, or skipping the operation using the first radio in response to the conflict in time between the first radio and the monitoring for the wake-up signal with the second radio, and the priority of the operation not meeting the threshold.

Aspect 15 is the method of aspect 11, where the method further includes performing the operation based on a highest priority among priorities of multiple operations using the first radio in response to a conflict in time between the communication via the first radio and monitoring, via the second radio, wake-up signal occasions associated with the multiple operations.

Aspect 16 is the method of aspect 11, where the method further includes performing the operation using the first radio in response to a conflict in time between the first radio and monitoring for the wake-up signal with the second radio, and based on the conflict not being known to a network entity, or skipping the operation using the first radio in response to the conflict in time between the communication via the first radio and the monitoring for the wake-up signal with the second radio, and based on the conflict being known to the network entity.

Aspect 17 is the method of aspect 11, where the method further includes skipping the operation using the first radio if a physical downlink control channel (PDCCH) monitoring occasion overlaps in time with a PDCCH skipping duration.

Aspect 18 is the method of aspect 17, where the method further includes monitoring for the PDCCH based on a reduced priority if the PDCCH monitoring occasion overlaps in time with the PDCCH skipping duration.

Aspect 19 is the method of aspect 10, wherein the UE switches between the communication via the first radio and the second radio for a first frequency band, and the method further includes: simultaneously communicating via the first radio and the second radio on different frequency bands.

Aspect 20 is the method of aspect 10, wherein the operation includes one or more of a physical downlink control channel (PDCCH) reception, a semi-persistent physical downlink shared channel (PDSCH) reception, or a periodic channel state information reference signal (CSI-RS) reception.

Aspect 21 is the method of aspect 10, where the method further includes receiving multiple configurations, including the configuration, for multiple wake-up signals associated with the second radio, each of the multiple configurations associated with one of multiple operations of the first radio based on a reception of a corresponding wake-up signal at the second radio.

Aspect 22 is an apparatus for wireless communication at a UE, including: a memory; and at least one processor coupled to the memory and, based at least in part on information stored in the memory, the at least one processor is configured to perform the method of any of aspects 10-21.

Aspect 23 is an apparatus for wireless communication including means for implementing the method of any of aspects 110-21.

Aspect 24 is a computer-readable medium (e.g., a non-transitory computer-readable medium) storing computer executable code, where the code when executed by a processor causes the processor to implement the method of any of aspects 10-21.

Aspect 25 is a method of wireless communication at a network entity. The method includes transmitting, to a UE, a configuration for a wake-up signal associated with a second radio having a lower power consumption than a first radio at the UE. The configuration includes a starting time for an operation of the first radio based on a reception of the wake-up signal. The method further includes transmitting the wake-up signal for the UE; and communicating with the UE based on the operation of the first radio at the starting time following the of the wake-up signal via the second radio.

Aspect 26 is the method of aspect 25, where the operation of the first radio includes DRX, and the configuration for the wake-up signal includes a DRX ON duration and a DRX inactivity window, and communicating with the UE based on the operation includes: transmitting a PDCCH wake-up signal using the first radio at the starting time after the reception of the wake-up signal via the second radio.

Aspect 27 is the method of aspect 25, where the operation of the first radio includes a PDCCH monitoring window, and the configuration for the wake-up signal includes a duration for the PDCCH monitoring window, and communicating with the UE based on the operation includes: transmitting for PDCCH during the PDCCH monitoring window using the first radio at the starting time after the reception of the wake-up signal via the second radio.

Aspect 28 is the method of aspect 25, where the method further includes scheduling the UE to communicate via the first radio during one or more occasions configured for wake-up signal monitoring via the second radio.

Aspect 29 is the method of aspect 25, where the method further includes configuring the UE to switch between communication via the first radio and the second radio.

Aspect 30 is the method of aspect 29, where the network entity communicates with the UE based on the operation in response to a conflict in time between communication with the first radio of the UE and a wake-up signal occasion for the second radio.

Aspect 31 is the method of aspect 29, where the method further includes skipping the communication based on the operation in response to a conflict in time between the communication with the first radio of the UE and a wake-up signal occasion for the second radio.

Aspect 32 is the method of aspect 25, where the method further includes communicating with the UE or skipping communication with the UE based on the operation using the first radio in response to a conflict in time between the first radio and monitoring for the wake-up signal with the second radio, and based on a priority of the operation meeting a threshold.

Aspect 33 is the method of aspect 29, where the network entity configures the UE to switch between the communication via the first radio and the second radio for a first frequency band, and the method further includes: configuring the UE for simultaneous communication via the first radio and the second radio on different frequency bands.

Aspect 34 is the method of aspect 25, where the operation includes one or more of a PDCCH reception, a semi-persistent PDSCH reception, or a periodic CSI-RS reception.

Aspect 35 is the method of aspect 25, where the method further includes configuring multiple configurations for the UE, including the configuration, for multiple wake-up signals associated with the second radio, each of the multiple configurations including a corresponding starting time for one of multiple operations of the first radio based on the reception of a corresponding wake-up signal.

Aspect 36 is an apparatus for wireless communication at a network entity, including: a memory; and at least one processor coupled to the memory and, based at least in part on information stored in the memory, the at least one processor is configured to perform the method of any of aspects 25-35.

Aspect 37 is an apparatus for wireless communication including means for implementing the method of any of aspects 25-35.

Aspect 38 is a computer-readable medium (e.g., a non-transitory computer-readable medium) storing computer executable code, where the code when executed by a processor causes the processor to implement the method of any of aspects 25-35.

What is claimed is:

1. An apparatus for wireless communication at a user equipment (UE), comprising:
memory; and
at least one processor coupled to the memory and configured to:
receive a configuration for a wake-up signal associated with a second radio having a lower power consumption than a first radio at the UE, the configuration including a starting time for an operation of the first radio based on a reception of the wake-up signal, wherein the configuration does not include a periodicity for the operation of the first radio and does not include a start offset associated with the periodicity for the operation of the first radio;
receive the wake-up signal via the second radio; and
start the operation of the first radio at the starting time following the reception of the wake-up signal via the second radio.

2. The apparatus of claim 1, wherein the operation of the first radio includes discontinuous reception (DRX), and the configuration for the wake-up signal includes a DRX ON duration and a DRX inactivity window, wherein, to start the operation, the at least one processor is configured to:
monitor for a physical downlink control channel (PDCCH) using the first radio at the starting time after the reception of the wake-up signal via the second radio.

3. The apparatus of claim 2, wherein the at least one processor is further configured to:
wake up the first radio for the DRX ON duration at the starting time after the reception of the wake-up signal via the second radio.

4. The apparatus of claim 1, wherein the operation of the first radio includes a physical downlink control channel (PDCCH) monitoring window, and the configuration for the wake-up signal includes a duration for the PDCCH monitoring window, wherein, to start the operation, the at least one processor is configured to:
monitor for PDCCH during the PDCCH monitoring window using the first radio at the starting time after the reception of the wake-up signal via the second radio.

5. The apparatus of claim 4, wherein the PDCCH monitoring window is dedicated to an extended reality (XR) service.

6. An apparatus for wireless communication at a user equipment (UE), comprising:
memory; and
at least one processor coupled to the memory and configured to:
receive a configuration for a wake-up signal associated with a second radio having a lower power consumption than a first radio at the UE;
receive the wake-up signal via the second radio; and
start, in response to the wake-up signal via the second radio, an operation via the first radio and, wherein the UE concurrently monitors for the wake-up signal via the second radio during the operation via the first radio;
skip the operation using the first radio if a physical downlink control channel (PDCCH) monitoring occasion overlaps in time with a PDCCH skipping duration; and
monitor for a PDCCH on a reduced priority if the PDCCH monitoring occasion overlaps in time with the PDCCH skipping duration.

7. The apparatus of claim 6, wherein the at least one processor is further configured to:
switch between communication via the first radio and the second radio.

8. The apparatus of claim 7, wherein the at least one processor is further configured to:
perform the operation using the first radio in response to a conflict in time between the first radio and monitoring for the wake-up signal with the second radio.

9. The apparatus of claim 7, wherein the at least one processor is further configured to:
skip the operation using the first radio in response to a conflict in time between the first radio and monitoring for the wake-up signal with the second radio.

10. The apparatus of claim 7, wherein the at least one processor is further configured to:
perform the operation using the first radio in response to a conflict in time between the first radio and monitoring for the wake-up signal with the second radio, and a priority of the operation meeting a threshold, or
skip the operation using the first radio in response to the conflict in time between the first radio and the monitoring for the wake-up signal with the second radio, and the priority of the operation not meeting the threshold.

11. The apparatus of claim 7, wherein the at least one processor is further configured to:
perform the operation based on a highest priority among priorities of multiple operations using the first radio in response to a conflict in time between the communication via the first radio and monitoring, via the second radio, wake-up signal occasions associated with the multiple operations.

12. The apparatus of claim 7, wherein the at least one processor is further configured to:
perform the operation using the first radio in response to a conflict in time between the first radio and monitoring for the wake-up signal with the second radio, and based on the conflict not being known to a network entity, or
skip the operation using the first radio in response to the conflict in time between the communication via the first radio and the monitoring for the wake-up signal with the second radio, and based on the conflict being known to the network entity.

13. The apparatus of claim 6, wherein the UE switches between the communication via the first radio and the second radio for a first frequency band, and the at least one processor is further configured to:
simultaneously communicate via the first radio and the second radio on different frequency bands.

14. The apparatus of claim 6, wherein the operation includes one or more of a physical downlink control channel (PDCCH) reception, a semi-persistent physical downlink shared channel (PDSCH) reception, or a periodic channel state information reference signal (CSI-RS) reception.

15. The apparatus of claim 6, wherein the at least one processor is further configured to:
receive multiple configurations, including the configuration, for multiple wake-up signals associated with the second radio, each of the multiple configurations associated with one of multiple operations of the first radio based on a reception of a corresponding wake-up signal at the second radio.

16. An apparatus for wireless communication at a network entity, comprising:
memory; and
at least one processor coupled to the memory and configured to:
transmit, to a user equipment (UE), a configuration for a wake-up signal associated with a second radio having a lower power consumption than a first radio at the UE, the configuration including a starting time for an operation of the first radio based on a reception of the wake-up signal, and wherein the configuration does not include a periodicity for the operation of the first radio and does not include a start offset associated with the periodicity for the operation of the first radio;
transmit the wake-up signal for the UE; and
communicate with the UE based on the operation of the first radio at the starting time following the wake-up signal via the second radio.

17. The apparatus of claim 16, wherein the operation of the first radio includes discontinuous reception (DRX), and the configuration for the wake-up signal includes a DRX ON duration and a DRX inactivity window, wherein, to communicate with the UE based on the operation, the at least one processor is configured to:
transmit a physical downlink control channel (PDCCH) wake-up signal using the first radio at the starting time after the reception of the wake-up signal via the second radio.

18. The apparatus of claim 16, wherein the operation of the first radio includes a physical downlink control channel (PDCCH) monitoring window, and the configuration for the wake-up signal includes a duration for the PDCCH monitoring window, wherein, to communicate with the UE based on the operation, the at least one processor is configured to:
transmit for PDCCH during the PDCCH monitoring window using the first radio at the starting time after the reception of the wake-up signal via the second radio.

19. The apparatus of claim 16, wherein the at least one processor is further configured to:
schedule the UE to communicate via the first radio during one or more occasions configured for wake-up signal monitoring via the second radio.

20. The apparatus of claim 16, wherein the at least one processor is further configured to:
configure the UE to switch between communication via the first radio and the second radio.

21. The apparatus of claim 20, wherein the network entity communicates with the UE based on the operation in response to a conflict in time between communication with the first radio of the UE and a wake-up signal occasion for the second radio.

22. The apparatus of claim 20, wherein the at least one processor is further configured to:
skip the communication based on the operation in response to a conflict in time between the communication with the first radio of the UE and a wake-up signal occasion for the second radio.

23. The apparatus of claim 20, wherein the network entity configures the UE to switch between the communication via the first radio and the second radio for a first frequency band, and the at least one processor is further configured to:
configure the UE for simultaneous communication via the first radio and the second radio on different frequency bands.

24. The apparatus of claim 16, wherein the at least one processor is further configured to:
communicate with the UE to skip communication with the UE based on the operation using the first radio in response to a conflict in time between the first radio and monitoring for the wake-up signal with the second radio, and based on a priority of the operation meeting a threshold.

25. The apparatus of claim 16, wherein the operation includes one or more of a physical downlink control channel (PDCCH) reception, a semi-persistent physical downlink shared channel (PDSCH) reception, or a periodic channel state information reference signal (CSI-RS) reception.

26. The apparatus of claim 16, wherein the at least one processor is further configured to:
configure multiple configurations for the UE, including the configuration, for multiple wake-up signals associated with the second radio, each of the multiple configurations including a corresponding starting time for one of multiple operations of the first radio based on the reception of a corresponding wake-up signal.

27. A method of wireless communication at a user equipment (UE), comprising:
receiving a configuration for a wake-up signal associated with a second radio having a lower power consumption than a first radio at the UE, the configuration including a starting time for an operation of the first radio based on a reception of the wake-up signal, wherein the configuration does not include a periodicity for the operation of the first radio and does not include a start offset associated with the periodicity for the operation of the first radio;

receiving the wake-up signal via the second radio; and starting the operation of the first radio at the starting time following the reception of the wake-up signal via the second radio.

\* \* \* \* \*